(12) United States Patent
Cho et al.

(10) Patent No.: US 11,227,597 B2
(45) Date of Patent: Jan. 18, 2022

(54) ELECTRONIC DEVICE AND CONTROLLING METHOD THEREOF

(71) Applicant: Samsung Electronics Co., Ltd., Suwon-si (KR)

(72) Inventors: Hyunkook Cho, Suwon-si (KR); Taeyoung Kim, Suwon-si (KR); Sunghee Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 16/748,238

(22) Filed: Jan. 21, 2020

(65) Prior Publication Data

US 2020/0234704 A1 Jul. 23, 2020

(30) Foreign Application Priority Data

Jan. 21, 2019 (KR) .................. 10-2019-0007710

(51) Int. Cl.
| | | |
|---|---|---|
| *G10L 17/00* | (2013.01) | |
| *G10L 15/20* | (2006.01) | |
| *G10L 15/22* | (2006.01) | |
| *H04R 1/40* | (2006.01) | |
| *G10L 21/0272* | (2013.01) | |
| *H04R 3/00* | (2006.01) | |

(52) U.S. Cl.
CPC .......... *G10L 15/22* (2013.01); *G10L 21/0272* (2013.01); *H04R 1/406* (2013.01); *H04R 3/005* (2013.01); *G10L 2015/223* (2013.01)

(58) Field of Classification Search
CPC .... G10L 17/26; G10L 25/78; H04M 2201/40; H04M 2250/74; H04M 1/271

USPC .................................. 704/231, 246
See application file for complete search history.

(56) References Cited

U.S. PATENT DOCUMENTS

| | | |
|---|---|---|
| 2003/0018479 A1 | 1/2003 | Oh et al. |
| 2004/0059573 A1 | 3/2004 | Cheong |
| 2010/0070274 A1 | 3/2010 | Cho et al. |

(Continued)

FOREIGN PATENT DOCUMENTS

| | | |
|---|---|---|
| JP | 2013-070202 A | 4/2013 |
| KR | 10-0368289 B1 | 1/2003 |

(Continued)

*Primary Examiner* — George C Monikang
(74) *Attorney, Agent, or Firm* — Jefferson IP Law, LLP

(57) ABSTRACT

An electronic device for performing a voice recognition and a controlling method are provided. The method includes receiving a plurality of voice signals and a metadata signal in a non-audible frequency band regarding at least one of the plurality of voice signals, through the plurality of microphones, obtaining direction information and frequency band information regarding each of the plurality of voice signals and the metadata signal, identifying the plurality of voice signals and the metadata signal, respectively, based on the direction information and the frequency band information, identifying a voice signal of which direction information is same as direction information of the metadata signal and a voice signal of which direction information is different from direction information of the metadata signal, respectively, among the plurality of voice signals, and performing a voice recognition based on the voice signal of which direction information is different from the direction information of the metadata signal.

20 Claims, 10 Drawing Sheets

(56) References Cited

U.S. PATENT DOCUMENTS

| | | |
|---|---|---|
| 2013/0297319 A1 | 11/2013 | Kim |
| 2017/0083285 A1 | 3/2017 | Meyers et al. |
| 2017/0090864 A1 | 3/2017 | Jorgovanovic |
| 2018/0182397 A1 | 6/2018 | Carbune et al. |
| 2020/0098386 A1* | 3/2020 | Smith .................... G10L 25/03 |

FOREIGN PATENT DOCUMENTS

| | | |
|---|---|---|
| KR | 10-1178801 B1 | 8/2012 |
| KR | 10-1884446 B1 | 8/2018 |

* cited by examiner

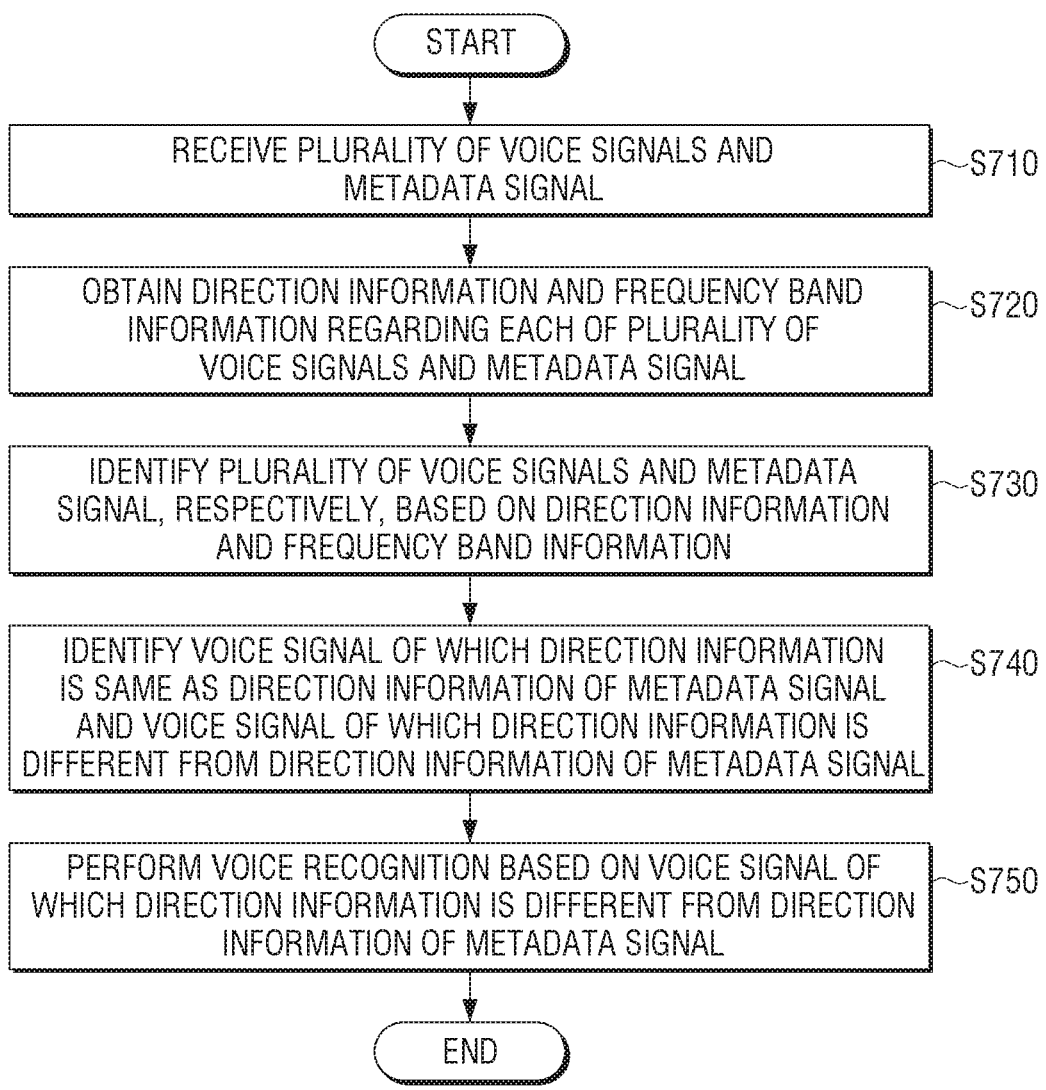

ELECTRONIC DEVICE AND CONTROLLING METHOD THEREOF

CROSS-REFERENCE TO RELATED APPLICATION(S)

This application is based on and claims priority under 35 U.S.C. § 119(a) of a Korean patent application number 10-2019-0007710, filed on Jan. 21, 2019, in the Korean Intellectual Property Office, the disclosure of which is incorporated by reference herein in its entirety.

BACKGROUND

1. Field

The disclosure relates to an electronic device and a controlling method. More specifically, the disclosure relates to an electronic device that may perform a voice recognition and a controlling method thereof.

2. Description of Related Art

Recently, due to the development of an artificial intelligence (AI), a voice recognition technology has been applied to various electronic devices including a smart phone, an AI speaker, and the like. However, as a plurality of electronic devices which can perform a voice recognition exist in the usage environment of a user, the possibility that the voice signal output by an external device may act as a noise when a specific electronic device performs a voice recognition has been increased.

According thereto, the technology for building the data-based regarding direction information of an external device and filtering a voice signal of an external device by comparing the direction information of the external device included in the database and the direction information of the received voice signal, and a technology in which the electronic device identifies and filters the voice signal of the external device according to that the external device inserts the identification information into the voice signal and output, have been developed.

However, in case of the technology that the databased regarding the direction information of the external device is built in advance, there is a problem that it is difficult to adaptably respond to the change of the location of the external device, and in case of the technology that the external device inserts identification information into the voice signal and output, there is a problem that both of the voice signal output by the external device and the voice signal of a user in the same frequency band may be filtered.

Accordingly, there is a growing need of a technology for performing a voice recognition smoothly according to the intension of a user by reflecting the change of the location of the external device in real time and filtering the voice signal output by the external device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that may perform a voice recognition based on the voice of a user by filtering the voice signal output by an external device based on the direction information of the metadata signal received from an external device, and a controlling method of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a plurality of microphones, a memory including at least one command, and a processor configured to execute the at least one command, and the processor is configured to receive a plurality of voice signals and a metadata signal in a non-audible frequency band regarding at least one of the plurality of voice signals, through the plurality of microphones, obtain direction information and frequency band information regarding each of the plurality of voice signals and the metadata signal, identify the plurality of voice signals and the metadata signal, respectively, based on the direction information and the frequency band information, identify a voice signal of which direction information is same as direction information of the metadata signal and a voice signal of which direction information is different from direction information of the metadata signal, respectively, among the plurality of voice signals, and perform a voice recognition based on a voice signal of which direction information is different from direction information of the metadata signal.

A voice signal of which direction information is different from direction information of the metadata signal among the plurality of voice signals is a voice signal according to a voice of a user, and a voice signal of which direction information is same as direction information of the metadata signal among the plurality of voice signals is a voice signal output by an external device, and the metadata signal includes information related to an identification of the external device.

The processor may receive the metadata signal periodically from the external device, and obtain and store direction information regarding the external device based on the metadata signal.

The processor may identify a voice signal of which direction information is same as direction information of the external device and a voice signal of which direction information is different from direction information of the external device, respectively, among the plurality of voice signals, based on direction information regarding the external device, and perform a voice recognition based on a voice signal of which direction information is different from direction information of the external device.

The electronic device may further include an inputter including a circuit, and the processor may register at least one external device as a registration device according to a user command input through the inputter, and based on the external device being included in at least one external device registered as the registration device, perform a voice recognition based on a voice signal of which direction information is same as direction information of the external device.

The processor may obtain information on a relative location of the electronic device and the external device based on direction information regarding the external device, and determine a distance between the electronic device and a location where at least one voice signal is generated and a distance between the external device and a location where the at least one voice signal is generated, respectively, based on direction information on the at least one voice signal among the plurality of voice signals and information on a relative location of the electronic device and the external device.

The electronic device may further include a communicator including a circuit, and the processor, based on a distance between the electronic device and a location where the at least one voice signal is generated being determined to be shorter than a distance between the external device and a location where the at least one voice signal is generated, may transmit confirmation response information that the electronic device will perform a voice recognition based on the at least one voice signal to the external device through the communicator, and perform a voice recognition based on the at least one voice signal.

The processor may perform a voice recognition based on the at least one voice signal based on the distance between the electronic device and the location where the at least one voice signal is generated being determined to be longer than the distance between the external device and the location where the at least one voice signal is generated, and confirmation response information that the external device performs a voice recognition based on the at least one voice signal being not received from the external device through the communicator for a predetermined time.

The electronic device may further include an outputter including a circuit, and the processor may insert a metadata signal including information related to an identification of the electronic device into an obtained voice signal periodically, and output a voice signal to which the metadata signal is inserted, through the outputter.

The processor, based on the plurality of voice signals and the metadata signal being mixed and received, may divide the plurality of voice signals and the metadata signal using a blind source separation (BSS) technique, and obtain direction information regarding each of the plurality of voice signals and the metadata signal using a direction of arrival (DOA) technique using the plurality of microphones.

In accordance with another aspect of the disclosure, a controlling method of an electronic device is provided. The method includes receiving a plurality of voice signals and a metadata signal in a non-audible frequency band regarding at least one of the plurality of voice signals, through the plurality of microphones, obtaining direction information and frequency band information regarding each of the plurality of voice signals and the metadata signal, identifying the plurality of voice signals and the metadata signal, respectively, based on the direction information and the frequency band information, identifying a voice signal of which direction information is same as direction information of the metadata signal and a voice signal of which direction information is different from direction information of the metadata signal, respectively, among the plurality of voice signals, and performing a voice recognition based on a voice signal of which direction information is different from direction information of the metadata signal.

A voice signal of which direction information is different from direction information of the metadata signal among the plurality of voice signals is a voice signal according to a voice of a user, and a voice signal of which direction information is same as direction information of the metadata signal among the plurality of voice signals is a voice signal output by an external device, and the metadata signal includes information related to an identification of the external device.

The method further includes receiving the metadata signal periodically from the external device and obtaining and storing direction information regarding the external device based on the metadata signal.

The method further includes identifying a voice signal of which direction information is same as direction information of the external device and a voice signal of which direction information is different from direction information of the external device, respectively, among the plurality of voice signals, based on direction information regarding the external device, and performing a voice recognition based on a voice signal of which direction information is different from direction information of the external device.

The method further includes registering at least one external device as a registration device according to a user command, and based on the external device being included in at least one external device registered as the registration device, performing a voice recognition based on a voice signal of which direction information is same as direction information of the external device.

The method further includes obtaining information on a relative location of the electronic device and the external device based on direction information regarding the external device, and determining a distance between the electronic device and a location where at least one voice signal is generated and a distance between the external device and a location where the at least one voice signal is generated, respectively, based on direction information on the at least one voice signal among the plurality of voice signals and information on a relative location of the electronic device and the external device.

The method further includes, based on a distance between the electronic device and a location where the at least one voice signal is generated being determined to be shorter than a distance between the external device and a location where the at least one voice signal is generated, transmitting confirmation response information that the electronic device will perform a voice recognition based on the at least one voice signal to the external device, and performing a voice recognition based on the at least one voice signal.

The method further includes performing a voice recognition based on the at least one voice signal based on the distance between the electronic device and the location where the at least one voice signal is generated being determined to be longer than the distance between the external device and the location where the at least one voice signal is generated, and confirmation response information that the external device performs a voice recognition based on the at least one voice signal being not received from the external device through the communicator for a predetermined time.

The method further includes inserting a metadata signal including information related to an identification of the electronic device into an obtained voice signal periodically, and outputting a voice signal to which the metadata signal is inserted, through the outputter.

The method further includes, based on the plurality of voice signals and the metadata signal being mixed and received, dividing the plurality of voice signals and the metadata signal using a BSS technique, and the obtaining comprising obtaining direction information regarding each of the plurality of voice signals and the metadata signal using a DOA technique using the plurality of microphones.

In accordance with another aspect of the disclosure, a computer readable medium is provided. The computer readable medium includes a program for executing a controlling method of an electronic device, wherein the method includes receiving a plurality of voice signals and a metadata signal in a non-audible frequency band regarding at least one of the plurality of voice signals, through the plurality of microphones, obtaining direction information and frequency band information regarding each of the plurality of voice signals and the metadata signal, identifying the plurality of voice signals and the metadata signal, respectively, based on the direction information and the frequency band information, identifying a voice signal of which direction information is same as direction information of the metadata signal and a voice signal of which direction information is different from direction information of the metadata signal, respectively, among the plurality of voice signals, and performing a voice recognition based on a voice signal of which direction information is different from direction information of the metadata signal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 7 is a flowchart illustrating a controlling method of an electronic device according to an embodiment of the disclosure.

Throughout the drawings, like reference numerals will be understood to refer to like parts, components, and structures.

DETAILED DESCRIPTION

Figure 1:
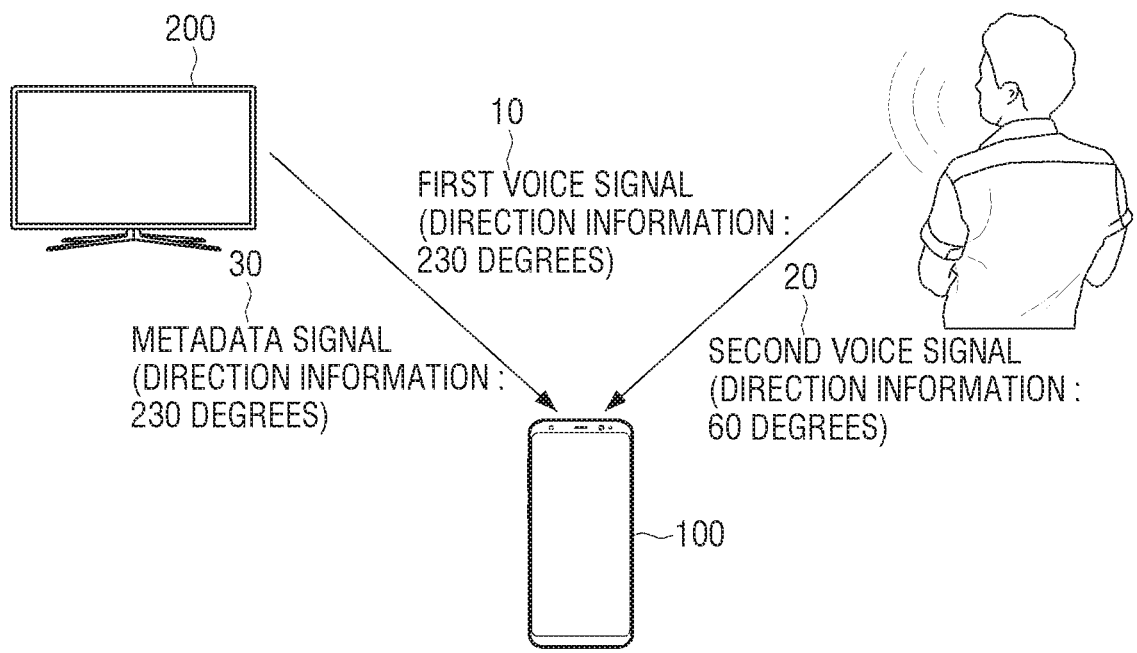
FIG. 1 is a view illustrating a controlling method of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Meanwhile, in case it is determined that in describing the embodiments, detailed explanation of related known technologies may unnecessarily confuse the gist of the disclosure, the detailed explanation will be omitted.

In addition, the embodiments may be changed in various forms, and therefore, the technical scope is not limited to the following embodiments. Rather, these embodiments are provided to make the disclosure thorough and complete and to give the technical idea of the disclosure thoroughly to those skilled in the art.

The terms used in the disclosure is for describing a specific embodiment and not intended to limit the scope of rights. In addition, singular expressions may be interpreted to include plural expressions, unless defined obviously differently in the context.

In the description, the term "has", "may have", "includes" or "may include" indicates existence of a corresponding feature (e.g., a numerical value, a function, an operation, or a constituent element, such as a component), but does not exclude existence of an additional feature.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

In addition, the expressions "first," "second" and the like used in the disclosure may be used to describe various elements, but the expressions are not intended to limit the elements. Such expressions are used only to distinguish one element from another element.

If it is described that a certain element (e.g., first element) is "(operatively or communicatively) coupled with/to" or is "connected to" another element (e.g., second element), it should be understood that the certain element may be connected to the other element directly or through still another element (e.g., third element).

Meanwhile, when it is mentioned that one element (e.g., first element) is "directly coupled" with or "directly connected to" another element (e.g., second element), it may be understood that there is no element (e.g., third element) present between one element and another element.

The expression "configured to (or set to)" used in one or more various embodiments may be replaced with "suitable for," "having the capacity to," "designed to," "adapted to," "made to," or "capable of" according to a context. The term "configured to (set to)" does not necessarily mean "specifically designed to" in a hardware level.

Under certain circumstances, the term "device configured to" may refer to "device capable of" doing something together with another device or components. For example, the phrase "processor configured to perform A, B, and C" may denote or refer to a dedicated processor (e.g., embedded processor) for performing the corresponding operations or a generic-purpose processor (e.g., central processing unit (CPU) or application processor) that can perform the corresponding operations through execution of one or more software programs stored in a memory device.

In the embodiment of the disclosure, the term "module," "unit," or "part" is referred to as an element that performs at least one function or operation, and may be implemented with hardware, software, or a combination of hardware and software. In addition, a plurality of "modules," a plurality of "units," a plurality of "parts" may be integrated into at least one module or chip except for a "module," a "unit," or a "part" which has to be implemented with specific hardware, and may be implemented with at least one processor.

Further, various elements and areas in the drawings are schematically drawn. Therefore, the technical ideas are not limited by a relative size or interval drawn in the accompanying drawings.

An electronic device according to various embodiments of the disclosure may include, for example, at least one of a smart phone, a tablet personal computer (PC), a desktop PC, a laptop PC, and a wearable device. According to various embodiments, the wearable device may include at least one of an accessory type (e.g., a watch, a ring, a bracelet, an ankle bracelet, a necklace, glasses, contact lens, or a head-mounted-device (HMD)), fabric or cloth-embedded type (e.g., e-cloth), body-attached type (e.g., skin pad or tattoo), or a bio-implant circuit (e.g., an implantable circuit).

In another embodiment, an electronic device may be a home appliance. The electronic device may include, for example, at least one of television, digital versatile disc (DVD) player, audio, refrigerator, air-conditioner, cleaner, oven, microwave, washing machine, air cleaner, set top box, home automation control panel, security control panel, media box (ex: Samsung HomeSync™, Apple TV™, or Google TV™), game console (ex: Xbox™, PlayStation™), e-dictionary, e-key, camcorder, or e-frame.

In another embodiment, an electronic device may include various medical devices (ex: various portable medical measuring devices (blood glucose monitor, heart rate monitor, blood pressure measuring device, or body temperature measuring device, and the like), magnetic resonance angiography (MRA), magnetic resonance imaging (MRI), computed tomography (CT), photographing device, or ultrasonic device, and the like), navigator, global navigation satellite system (GNSS), event data recorder (EDR), flight data recorder (FDR), vehicle info-tainment device, e-device for ships (ex: navigation device for ship, gyrocompass, and the like), avionics, security device, head unit for vehicles, industrial or home-use robots, drone, automatic teller machine (ATM) of financial institutions, point of sales (POS) of shops, or internet of things device (ex: bulb, sensors, sprinkler, fire alarm, temperature controller, streetlight, toaster, sporting goods, hot water tank, heater, boiler, and the like).

Hereinafter an embodiment of the disclosure will be described with reference to the accompanying drawings so as to be operable by those skilled in the art.

FIG. 1 is a view illustrating a controlling method of an electronic device according to an embodiment of the disclosure.

Referring to FIG. 1, an electronic device 100 according to an embodiment receives a plurality of voice signals 10 and 20 and a metadata signal 30. In addition, at least one of the plurality of voice signals 10 and 20, and the metadata signal 30 may be output from an external device 200.

Here, the electronic device 100 is a device which may receive a voice signal and perform a voice recognition based on the received voice signal, and may be implemented as a smart phone, an artificial intelligence (AI) speaker, and the like, for example. Meanwhile, the external device 200 is a device for outputting a voice signal and the metadata signal 30, and may include a digital television (TV) and a radio for example. However, the electronic device 100 and the external device 200 are not limited to the above examples.

Specifically, the electronic device 100 may receive the plurality of voice signals 10 and 20 through a plurality of microphones and the metadata signal 30 of a non-audible frequency band regarding at least one of the plurality of voice signals 10 and 20.

For example, if the external device 200 inserts the metadata signal 30 including the information related to the identification of the external device 200 into the obtained voice signal periodically, and outputs the voice signal to which the metadata signal 30 is inserted, the electronic device 100 may receive the voice signal and the metadata signal 30 output by the external device 200. In addition, if a user utters a voice, the electronic device 100 may receive the voice signal according to the voice of the user.

Here, the plurality of microphones mean a microphone array in which a plurality of microphones are arranged with an equal interval or an unequal interval, and this is for obtaining the direction information of the plurality of voice signals 10 and 20 and the metadata signal 30 which are received as described below.

Meanwhile, the operation that the electronic device 100 receives the plurality of voice signals 10 and 20 through the plurality of microphones should not be interpreted to mean that different voice signals included in the plurality of voices are received through different microphones included in the plurality of microphones, respectively. For example, the electronic device 100 according to the disclosure may receive a first voice signal 10 between the plurality of voice signals 10 and 20 through a plurality of microphones and receives a second voice signal 20 between the plurality of voice signals 10 and 20 through the plurality of microphones.

FIG. 1 illustrates an example in which the first voice signal 10 between the plurality of voice signals 10 and 20 is the voice signal output by the external device 200 and the second voice signal 20 between the plurality of voice signals 10 and 20 is the voice signal according to the voice of a user. In addition, the metadata signal 30 may include the information related to the identification of the external device 200 that outputs the first voice signal 10. Hereinafter the disclosure will be described with the example illustrated in FIG. 1.

If the plurality of voice signals 10 and 20 and the metadata signal 30 are received, the electronic device 100 obtains direction information and frequency band information regarding each of the plurality of voice signals 10 and 20 and the metadata signal 30.

Here, the direction information on each of the plurality of voice signals 10 and 20 and the metadata signal 30 means information on the direction of the location where the plurality of voice signals 10 and 20 and the metadata signal 30 are generated, based on the electronic device 100. In addition, the direction information on each of the plurality of voice signals 10 and 20 and the metadata signal 30 may be obtained by a direction of arrival (DOA) technique using a plurality of microphones, and the like.

Here, the DOA technique is a technique for obtaining direction information on the voice signal using the correlation of the voice signals input through each microphone among the plurality of microphones included in the microphone array. Specifically, according to the DOA technique, if a voice signal is received with a specific incidence angle to a plurality of microphones, the electronic device 100 obtains the incidence angle based on a delayed distance and a delayed time according to the difference of the distances between the voice signal and each of the microphone included in the plurality of microphones, at which the voice signal arrives, and obtain the direction information on the received voice signal based on the obtained incidence angle.

For example, the electronic device 100 may obtain the information that the location where the first voice signal 10 is generated is at the direction of 230 degrees based on the electronic device 100 as the direction information regarding the first voice signal 10, the information that the location where the second voice signal 20 is generated is at the direction of 60 degrees based on the electronic device 100 as the direction information regarding the second voice signal 20, and the information that the location where the signal is generated is at the direction of 230 degrees based on the electronic device 100 as the direction information regarding the metadata signal 30.

If the direction information and the frequency band information regarding each of the plurality of voice signals 10 and 20 and the metadata signal 30 are obtained, the electronic device 100 may identify the plurality of voice signals 10 and 20 and the metadata signal 30, respectively, based on the obtained direction information and frequency band information.

Specifically, the electronic device 100 distinguishes the metadata signal 30 of the non-audible frequency band and the plurality of voice signals 10 and 20 of the audible frequency band (20 Hz to 20 kHz) based on the obtained frequency band information, and distinguish the plurality of voice signals 10 and 20 into each voice signal based on the obtained direction information, and identify the plurality of voice signals 10 and 20 and the metadata signal 30, respectively.

For example, the electronic device 100 may distinguish the metadata signal 30 in the non-audible frequency band and the plurality of voice signals 10 and 20 in the audible frequency band, distinguish the plurality of voice signals 10 and 20 into the first voice signal 10 and the second voice signal 20 based on the obtained direction information of 230 degrees and 60 degrees, and identify the plurality of voice signals 10 and 20 and the metadata signal 30, respectively.

In addition, if each of the plurality of voice signals 10 and 20 and the metadata signal 30 is identified, the electronic device 100 may identify the voice signal of which direction information is the same as that of the metadata signal 30 and the voice signal of which direction information is different from that of the metadata signal 30, respectively.

Specifically, the electronic device 100 may compare the direction information on the metadata signal 30 and the direction information on the first voice signal 10 and the second voice signal 20, respectively, and identify the voice signal of which direction information is the same as that of the metadata signal 30 and the voice signal of which direction information is different from that of the metadata signal 30 from the plurality of voice signals 10 and 20, respectively.

For example, if the direction information of the first voice signal 10 is 230 degrees and the direction information of the second voice signal 20 is 60 degrees and the direction information of the metadata signal 30 is 230 degrees, the electronic device 100 may identify the first voice signal 10 of which direction information is the same as that of the metadata signal 30 between the plurality of voice signals 10 and 20, and identify the second voice signal 20 of which direction information is different from that of the metadata signal 30 between the plurality of voice signals 10 and 20.

Here, the case in which the direction information is the same is not limited to the case in which the pieces of direction information of different voice signals are physically the same, but includes the case in which the pieces of direction information of different voice signals are not physically the same but the difference thereof is within the predetermined range.

For example, if the direction information of the first voice signal 10 is 230 degrees and the direction information of the second voice signal 20 is 231 degrees, there is difference of 1 degree between the direction information of the first voice signal 10 and the second voice signal 20, but if the difference of 1 degree is within the predetermined range, it may be considered that the direction information of the first voice signal 10 and the direction information of the second voice signal 20 are the same.

In addition, here, the predetermined range is the range for considering the direction information of different voice signals to be the same although the direction information is not the same physically, and may be set differently according to the selection of the user considering the mobility and the usage environment and the like of the electronic device 100.

If the voice signal of which direction information is the same as that of the metadata signal 30, and the voice signal of which direction information is different from that of the metadata signal 30 are identified from among the plurality of voice signals 10 and 20, respectively, the electronic device 100 may perform a voice recognition based on the identified voice signal.

Specifically, if the voice signal of which direction information is the same as that of the metadata signal 30, and the voice signal of which direction information is different from that of the metadata signal 30 are identified, respectively, the electronic device 100 may filter the voice signal of which direction information is identified to be the same as the direction information of the metadata signal 30, and perform a voice recognition only based on the voice signal of which direction information is identified to be different from the direction information of the metadata signal 30.

In the example of FIG. 1, the electronic device 100 may filter the first voice signal 10 of which the direction information is identified to be the same as that of the metadata signal 30, and perform a voice recognition only based on the second voice signal 20 of which direction information is identified to be different from the direction information of the metadata signal 30. Accordingly, the electronic device 100 may filter the first voice signal 10 which is output by the external device 200 and perform a voice recognition only based on the second voice signal 20 according to the voice of a user.

Meanwhile, if the voice recognition is performed based on the voice signal of which direction information is identified to be different from that of the metadata signal 30, the electronic device 100 may output the output voice corresponding to the text obtained according to the voice recognition, and control the operation of the electronic device 100 according to the control command obtained according to the voice recognition.

According to an embodiment of the disclosure described above, the electronic device 100 filters the voice signal output by the external device 200 based on the direction information of the metadata signal 30 received from the external device 200, and perform an accurate voice recognition based on the voice of the user.

Figure 2:
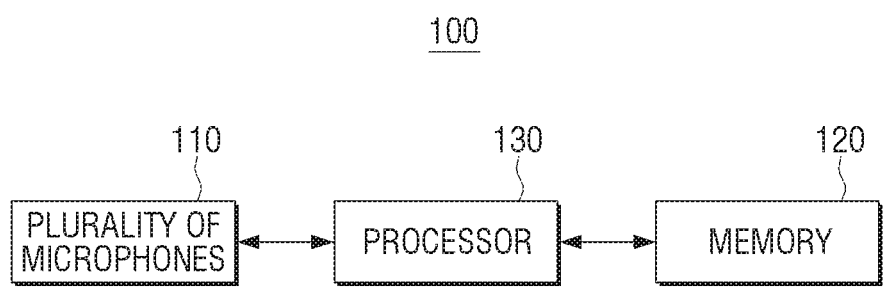
FIG. 2 is a block diagram illustrating a configuration of an electronic device according to an embodiment of the disclosure.

FIG. 2 is a block diagram illustrating a configuration of an electronic device according to an embodiment of the disclosure.

Referring to FIG. 2, the electronic device 100 according an embodiment of the disclosure may include a plurality of microphones 110, a memory 120, and a processor 130.

The plurality of microphones 110 may receive a voice signal. In addition, the plurality of microphones 110 converts the received voice signal into an electric signal. Especially, according to various embodiments, the processor 130 may receive a plurality of voice signals and the metadata signal in the non-audible frequency regarding at least one of the plurality of voice signals.

Meanwhile, the plurality of microphones 110 mean a microphone array in which a plurality of microphones 110 are arranged with an equal interval or an unequal interval, and this is for obtaining the direction information of the received voice signals and the metadata signal which will be described later.

The memory 120 may store at least one command regarding the electronic device 100. In addition, the memory 120 may store the operating system (O/S) for driving the electronic device 100. In addition, the memory 120 may store various types of software programs or applications for driving the electronic device 100 according to various embodiments of the disclosure. In addition, the memory 120 may include a semiconductor memory, such as a flash memory or a magnetic storage medium, such as a hard disk.

Specifically, the memory 120 may store various software modules for operating the electronic device 100 according to various embodiments of the disclosure and the processor 130 may control the operation of the electronic device 100 by executing various types of software modules stored in the memory 120. For example, the memory 120 may be accessed by the processor 130 and reading/writing/revising/deleting/updating of data may be performed by the processor 130.

Meanwhile, the term memory 120 in the disclosure may include a memory 120, a read only memory (ROM, not illustrated) and a random access memory (RAM, not illustrated), or a memory card (not illustrated) mounted on the electronic device 100 (e.g., a micro secure digital (SD) card, a memory stick).

Especially, in various embodiments according to the disclosure, the memory 120 may store the information on the plurality of voice signals received through a plurality of microphones 110, and the metadata signal of a non-audible frequency band regarding at least one of the plurality of voice signals. In addition, the memory 120 may store the direction information and the frequency band information regarding each of the plurality of voice signals and the metadata signal, the direction information on the external device 200, and the information on the relative location of the external device 200 and the electronic device 100.

The processor 130 controls an overall operation of the electronic device 100. Specifically, the processor 130 may be connected to the configuration of the electronic device 100 including the plurality of microphones 110 and the memory 120 described above, and control an overall operation of the electronic device 100 by executing at least one command stored in the memory 120.

The processor 130 may be implemented as various methods. For example, the processor 130 may be implemented as at least one of an application specific integrated circuit (ASIC), an embedded processor, a microprocessor, a hardware control logic, a hardware finite state machine (FSM) or a digital signal processor (DSP). Meanwhile, the term processor 130 in the disclosure may include the meanings of a CPU, a graphic processing unit (GPU), a main processing unit (MPU), and the like.

Especially, according to an embodiment of the disclosure, the processor 130 may receive a plurality of voice signals and a metadata signal. Specifically, the processor 130 may receive the plurality of voice signals through a plurality of microphones 110 and the metadata signal of a non-audible frequency band regarding at least one of the plurality of voice signals.

Specifically, if the external device 200 inserts the metadata signal including the information related to the identification of the external device 200 to the obtained voice signal periodically, and outputs the voice signal to which the metadata signal is inserted, the electronic device 100 may receive the voice signal and the metadata signal output by the external device 200. In addition, if a user utters a voice, the electronic device 100 may receive the voice signal according to the voice of the user.

Here, the plurality of microphones 110 mean a microphone array in which a plurality of microphones 110 are arranged with an equal interval or an unequal interval, and this is for obtaining the direction information of the voice signals and the metadata signal which are received, as described below.

Meanwhile, the operation that the processor 130 receives the plurality of voice signals through the plurality of microphones 110 should not be interpreted to mean that different voice signals included in the plurality of voices are received through different microphones included in the plurality of microphones 110, respectively. For example, the processor 130 according to the disclosure may receive the first voice signal among the plurality of voice signals through a plurality of microphones 110 and receives the second voice signal among the plurality of voice signals through a plurality of microphones 110.

For example, the first voice signal among the plurality of voice signals is the voice signal output from the external device 200 and the second voice signal among the plurality of voice signals is the voice signal according to the voice of a user. In addition, the metadata signal may include the information related to the identification of the external device 200 that outputs the first voice signal.

If the plurality of voice signals and the metadata signal are received, the processor 130 obtains the direction information and the frequency band information regarding each of the plurality of voice signals and the metadata signal.

Here, the direction information on each of the plurality of voice signals and the metadata signal means information on the direction of the location where the plurality of voice signals and the metadata signal are generated, based on the electronic device 100. In addition, the direction information on each of the plurality of voice signals and the metadata signal may be obtained by a DOA technique using the plurality of microphones 110, and the like.

For example, the processor 130 may obtain the information that the location where the first voice signal is generated is at the direction of 230 degrees based on the electronic device 100 as the direction information regarding the first voice signal, the information that the location where the second voice signal is generated is at the direction of 60 degrees based on the electronic device 100 as the direction information regarding the second voice signal, and the information that the location where the signal is generated is at the direction of 230 degrees based on the electronic device 100 as the direction information regarding the metadata signal.

If the direction information and the frequency band information regarding each of the plurality of voice signals and the metadata signal are obtained, the processor 130 may identify the plurality of voice signals and the metadata signal, respectively, based on the obtained direction information and frequency band information.

Specifically, the processor 130 distinguishes the metadata signal of the non-audible frequency band and the plurality of voice signals of the audible frequency band (20 Hz to 20 kHz) based on the obtained frequency band information, and distinguish the plurality of voice signals into each voice signal based on the obtained direction information, and identify the plurality of voice signals and the metadata signal, respectively.

For example, the processor 130 may distinguish the metadata signal in the non-audible frequency band and the plurality of voice signals in the audible frequency band, distinguish the plurality of voice signals into the first voice signal and the second voice signal based on the obtained information of 230 degrees and 60 degrees, and identify the plurality of voice signals and the metadata signal, respectively.

In addition, if each of the plurality of voice signals and the metadata signal are identified, the processor 130 may identify the voice signal of which direction information is the same as that of the metadata signal and the voice signal of which direction information is different from that of the metadata signal, respectively.

Specifically, the processor 130 may compare the direction information on the metadata signal and the direction information on the first voice signal and the second voice signal, respectively, and identify the voice signal of which direction information is the same as that of the metadata signal and the voice signal of which direction information is different from that of the metadata signal from the plurality of voice signals, respectively.

For example, if the direction information of the first voice signal is 230 degrees, the direction information of the second voice signal is 60 degrees, and the direction information of the metadata signal is 230 degrees, the processor 130 may identify the first voice signal of which direction information is the same as the metadata signal among the plurality of voice signals, and the second voice signal of which direction information is different from that of the metadata signal among the plurality of voice signals.

Here, the case in which the direction information is the same is not limited to the case in which the pieces of direction information of different voice signals are physically the same, but includes the case in which the pieces of direction information of the different voice signals are not physically the same but the difference thereof is within the predetermined range.

For example, the direction information of the first voice signal is 230 degrees and the direction information of the second voice signal is 231 degrees, there is a physical difference of 1 degree between the direction information of the first voice signal and the second voice signal, but if the difference of 1 degree is within the predetermined range, it may be considered that the direction information of the first voice signal and the direction information of the second voice signal are the same.

In addition, here, the predetermined range is the range for considering the direction information of different voice signals to be the same although the direction information is not the same physically, and may be set differently according to the selection of the user considering the mobility and the usage environment and the like of the electronic device 100.

If the voice signal of which direction information is the same as that of the metadata signal, and the voice signal of which direction information is not the same as that of the metadata signal are identified from among the plurality of voice signals, respectively, the processor 130 may perform a voice recognition based on the identified voice signal.

Specifically, if the voice signal of which direction information is the same as that of the metadata signal, and the voice signal of which direction information is not the same as that of the metadata signal are identified, respectively, the electronic device 100 may filter the voice signal of which direction information is identified to be the same as the direction information of the metadata signal, and perform a voice recognition only based on the voice signal of which direction information is identified to be different from the direction information of the metadata signal.

For example, the processor 130 may filter the first voice signal of which the direction information is identified to be the same as that of the metadata signal, and perform a voice recognition only based on the second voice signal of which direction information is identified to be different from the direction information of the metadata signal. Accordingly, the processor 130 may filter the first voice signal which is output by the external device 200 and perform a voice recognition only based on the second voice signal according to the voice of a user.

Meanwhile, if the voice recognition is performed based on the voice signal of which direction information is identified to be different from that of the metadata signal, the processor 130 may output the output voice corresponding to the text obtained according to the voice recognition, and control the operation of the electronic device 100 according to the control command obtained according to the voice recognition.

Meanwhile, according to an embodiment of the disclosure described above, the processor 130 may obtain and store the direction information on the external device 200 based on the metadata signal and perform a voice recognition based on the voice signal of which direction information is different from that of the external device 200.

Specifically, the processor 130 may receive the metadata signal from the external device 200 periodically, and obtain and store the direction information on the external device 200 based on the metadata signal. For example, according to an embodiment of the disclosure, the direction information on the external device 200 may be updated based on the metadata signal which is periodically received.

For example, the processor 130 may obtain and store the information that the external device 200 is located in the direction of 200 degrees based on the electronic device 100, as the direction information on the external device 200, and if the information that the external device 200 is located in the direction of 230 degrees based on the electronic device 100 based on the metadata signal received thereafter, the direction information on the pre-stored external device 200 may be updated and stored.

Meanwhile, the reception period of the metadata signal may vary according to the insertion period of the metadata regarding the voice signal output by the external device 200 and the output period of the metadata by the external device 200. In addition, the insertion period of the metadata regarding the output voice signal may be set differently according to the mobility of the electronic device 100 and the external device 200.

For example, as a television (TV), if the usage locations of the electronic device 100 and the external device 200 are generally fixed and the mobility thereof is low, there is a small actual profit to set a short insertion period of the metadata, but as a smartphone, if the usage locations of the electronic device 100 and the external device 200 are frequently changed and the mobility thereof is high, it may be preferred to set the insertion period of the metadata shortly and update the direction information on the external device 200 in the short period according thereto.

If the direction information on the external device 200 is obtained, the processor 130 may identify the voice signal of which direction information is the same as that of the external device 200 and the voice signal of which direction information is different from that of the external device 200, respectively, from among the plurality of voice signals, based on the direction information on the external device 200.

In addition, if the voice signal of which direction information is the same as that of the external device 200 and the voice signal of which direction information is different from that of the external device 200 are identified, the processor 130 may perform a voice recognition based on the voice signal of which direction information is different from that of the external device 200.

For example, if the direction information of the external device 200 is 230 degrees, and the direction information of the first voice signal is 230 degrees, and the direction information of the second voice signal is 60 degrees, the processor 130 may identify the first voice signal of which direction information is the same as that of the external device 200 and the second voice signal of which direction information is different from that of the external device 200 from among the a plurality of voice signals, and perform a voice recognition based on the second voice signal.

Meanwhile, in the above, an embodiment in which the voice recognition is performed based on the voice signal of which direction information is different from that of the external device 200 has been described, but according to an embodiment, the voice recognition may be performed based on the voice signal of which direction information is the same as that of the external device 200.

Specifically, the processor 130 may register at least one external device 200 as a registration device according to the user command input through an inputter. In addition, if the external device 200 identified by the metadata signal is included in at least one external device 200 registered as the registration device, the processor 130 may perform a voice recognition based on the voice signal of which direction information is the same as that of the external device 200 identified by the metadata signal.

In other words, even if it is identified that the received voice signal is a voice signal output by the external device 200, if the user command for registering the external device 200 as a registration device is input, the processor 130 may perform a voice recognition based on the voice signal output by the external device 200.

For example, if the voice signal output by a TV after the TV is registered as a registration device according to the user command is received, the processor 130 may perform a voice recognition based on the voice signal output by the TV.

Meanwhile, the user command for registering the external device 200 as a registration device may include the condition for considering the external device 200 as the registration device for a specific time period.

For example, if a user command for considering a radio as a registration device from 10:10 AM to 10:20 AM is input, the processor 130 may receive the voice signal regarding the weather forecast output from 10:10 AM to 10:20 AM, and perform a voice recognition based on the received voice signal. In addition, the processor 130 may obtain the information on the weather forecast corresponding to the text obtained according to the voice recognition, and output the output voice based on the obtained information.

Meanwhile, an embodiment in which the voice recognition is performed based on the voice signal output by the external device 200 has been described, but the above embodiment does not exclude the operation for performing a voice recognition based on the voice signal according to the voice of the user, needless to say.

Specifically, according to an embodiment of the disclosure, the processor 130 may gradually receive the voice signal output by the external device 200 and the voice signal according to the voice of the user, and perform a sequential voice recognition based on the voice signal output by the external device 200 and the voice signal according to the voice of a user. In addition, the processor 130 may control the operation of the electronic device 100 based on the result of the sequential voice recognition.

For example, the processor 130 may control the electronic device 100 to execute an application regarding the chess game, and proceed with the chess match between the external device 200 and a user based on the sequential voice recognition regarding the voice signal output by the external device 200, such as an AI speaker and the voice signal according to the user voice.

According to an embodiment of the disclosure, the electronic device 100 may perform a dynamic voice recognition through a collaboration between the external device 200 and a user or a mutual collaboration of the plurality of external devices 200.

Meanwhile, according to an embodiment of the disclosure, the processor 130 may determine the device to perform a voice recognition regarding at least one of the voice signals of the electronic device 100 and the external device 200 based on the information on the relative location of the electronic device 100 and the external device 200.

Specifically, the processor 130 may obtain the information on the relative location of the electronic device 100 and the external device 200 based on the direction information on the external device 200. Here, the relative location of the electronic device 100 and the external device 200 means the information on the direction where the external device 200 is located based on the electronic device 100.

In addition, if the information on the relative location of the electronic device 100 and the external device 200 is obtained, the processor 130 may determine the distance between the electronic device 100 and the location where at least one voice signal is generated, and the distance between the external device 200 and the location where at least one voice signal is generated, respectively, based on the direction information on at least one voice signal from among the plurality of voice signals and the information on the relative location of the electronic device 100 and the external device 200.

Meanwhile, if it is determined that the distance between the electronic device 100 and the location where at least one voice signal is generated is shorter than the distance between the external device 200 and the location where at least one voice signal is generated, the processor 130 may transmit the confirmation response information that the electronic device 100 will perform a voice recognition based on at least one voice signal, to the external device 200, and perform a voice recognition based on at least one voice signal.

Meanwhile, if it is determined that the distance between the electronic device 100 and the location where at least one voice signal is generated is longer than the distance between the external device 200 and the location where at least one voice signal is generated, and if the confirmation response information that the external device 200 will perform a voice recognition based on at least one voice signal is not received from the external device 200 through the communicator for a predetermined time, the processor 130 may perform a voice recognition based on at least one voice signal.

The embodiment in which the voice recognition is performed based on the information regarding the relative location of the electronic device 100 and the external device 200 will be described with reference to FIG. 6A and FIG. 6B.

According to an embodiment of the disclosure described above, the electronic device 100 may filter the voice signal output from the external device 200 based on the direction information of the signal of the metadata received from the external device 200, and perform an accurate voice recognition based on the user's voice.

In addition, the electronic device 100 according to the disclosure reflects the direction information of the signal of the metadata received from the external device 200, in real time, and thus, despite of the change of the location of the external device 200, the voice signal output by the external device 200 may be filtered accurately.

In addition, the electronic device 100 according to the disclosure may filter the voice signal output by the external device 200 based on whether the direction information of the metadata signal is the same with the direction information of the voice signal, and thus, despite of the change of the usage environment, such as temperature or humidity, the voice recognition may be performed smoothly.

Figure 3:
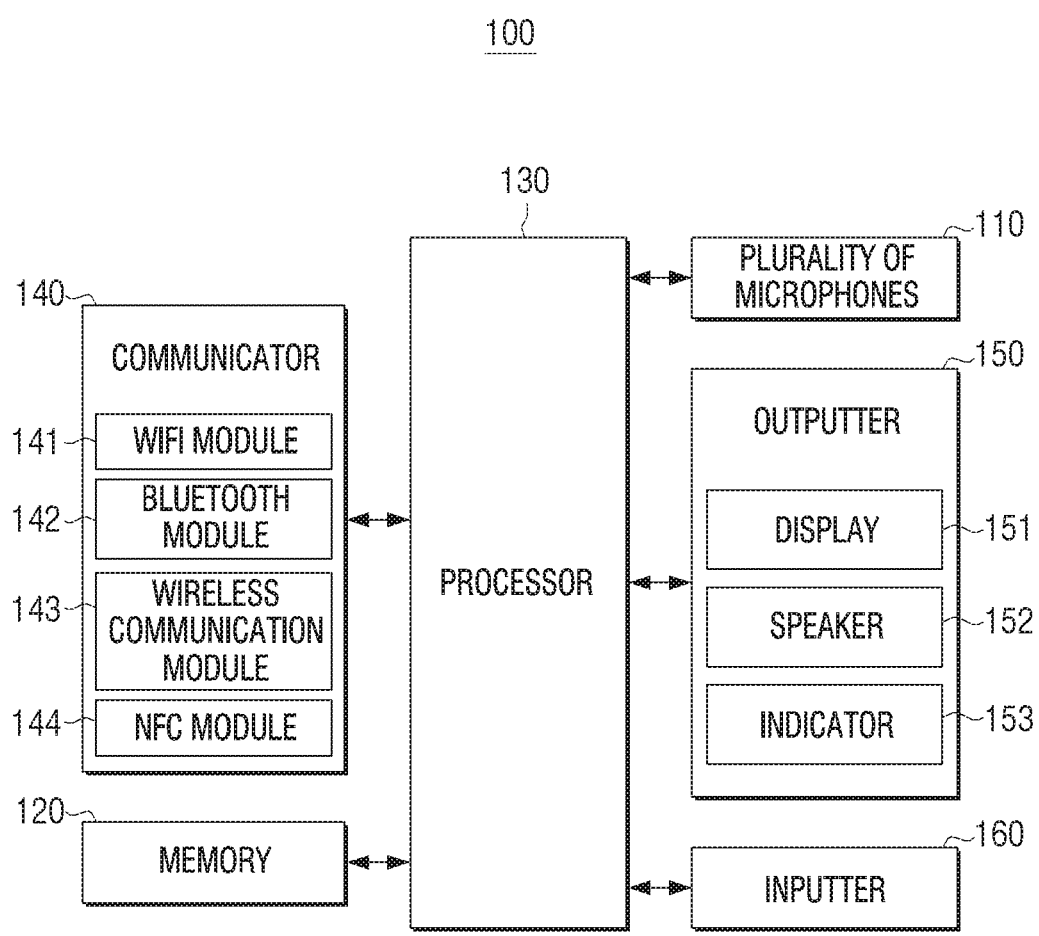
FIG. 3 is a block diagram illustrating a configuration of an electronic device according to an embodiment of the disclosure.

FIG. 3 is a block diagram illustrating a configuration of an electronic device according to an embodiment of the disclosure.

Referring to FIG. 3, the electronic device 100 according to an embodiment may include not only a plurality of microphones 110, the memory 120, and the processor 130 but also a communicator 140, an outputter 150 and the inputter. However, these configurations are merely an example and implementing the disclosure, new configurations may be added in addition to the above configurations or some configurations may be omitted.

The communicator 140 may include a circuit and communicate with a server (not illustrated) or the external device 200. Specifically, the processor 130 may receive various data and information from a server (not illustrated) or the external device 200 connected through the communicator 140, and may transmit various types of data or information to the server (not illustrated) or the external device 200.

The communicator 140 may include at least one of a Wi-Fi module 141, a Bluetooth (BT) module 142, a wireless communication module 143 or a near field communication (NFC) module 144. Specifically, each of the Wi-Fi module 141 and the Bluetooth module 142 may perform a communication in a Wi-Fi method and a Bluetooth method, respectively. In a case in which the Wi-Fi module 141 or the Bluetooth module 142 are used, various types of connection information, such as service set identifier (SSID), and the like, may be transmitted or received first, a communication connection is performed using these, and various types of information may be transmitted and received.

In addition, the wireless communication module 143 may perform a communication according to the various types of communication standards, such as an institute of electrical and electronic engineers (IEEE), Zigbee, 3rd generation (3G), 3rd generation partnership project (3GPP), long term evolution (LTE), and 5th generation (5G). In addition, the NFC module 144 may perform a communication in the NFC method in which 13.56 MHz band from among various radio-frequency identification (RF-ID) frequency bands, such as 135 kHz, 13.56 MHz, 433 MHz, 860 to 960 MHz, and 2.45 GHz.

Especially, according to various embodiment according to the disclosure, the processor 130 may transmit the confirmation response information that the electronic device 100 will perform a voice recognition based on the received voice signal to the external device 200 through the communicator 140, and receive the confirmation response information that the external device 200 will perform a voice recognition based on the received voice signal from the external device 200 through the communicator 140.

In addition, the processor 130 may transmit information on the plurality of voice signals and the metadata signal, direction information and the frequency band information regarding each of the plurality of voice signals and the metadata signal, direction information on the external device 200, and information on the relative location of the external device 200 and the electronic device 100, to the external device 200 and may receive information on the plurality of voice signals and the metadata signal, direction information and the frequency band information regarding each of the plurality of voice signals and the metadata signal, direction information on the external device 200, and information on the relative location of the external device 200 and the electronic device 100, through the communicator 140.

The outputter 150 may include a circuit, and the processor 130 may output various functions which may be performed by the electronic device 100 through the outputter 150. In addition, the outputter 150 may include at least one of a display 151, a speaker 152 or an indicator 153.

The display may output the image data by a control of the processor 130. Specifically, the display may output the image pre-stored in the memory 120 by a control of the processor 130. Especially, the display according to an embodiment of the disclosure may display a user interface stored in the memory 120.

The display may be implemented as a liquid crystal display panel (LCD), organic light emitting diodes (OLED), and the like, and the display may be implemented as a flexible display, a transparent display, and the like, according to circumstances. However, the display according to the disclosure is not limited to a specific type.

The speaker may output the audio data according to the control of the processor 130 and an indicator may be turned on by the control the processor 130.

Especially, according to various embodiments of the disclosure, the processor 130 may insert the metadata signal including the information related to the identification of the electronic device 100 into the obtained voice signal periodically, and output the voice signal to which the metadata signal is inserted through the outputter 150.

In addition, the outputter 150 may output the direction information and the frequency band information regarding each of the plurality of voice signals and the metadata signal, direction information on the external device 200, and the information on the relative location of the external device 200 and the electronic device 100.

An inputter 160 includes a circuit, and the processor 130 may receive a user command for controlling the operation of the electronic device 100 through the inputter 160. Specifically, the inputter 160 may consist of the configuration, such as a microphone, a camera (not illustrated), and a remote controller receiver (not illustrated). In addition, the inputter 160 may be implemented as a form of a touch screen included in a display.

As described above, the electronic device 100 according to the disclosure may include a microphone 110, and the processor 130 may receive the plurality of voice signals and the metadata signal through the plurality of microphones 110. In addition, the direction information of the plurality of voice signals and the metadata signal may be obtained using the DOA technique using the microphone 110.

Here, the DOA technique is a technique for obtaining direction information on the voice signal using the correlation of the voice signals input through each microphone among the plurality of microphones 110 included in the microphone array. Specifically, according to the DOA technique, if the voice signal is received in a specific incidence angle to a plurality of microphones 110, the incidence angle of the voice signal may be obtained based on the delayed distance and the delayed time according to the difference of the distances between the voice signal and each of the microphones included in the plurality of microphones 110, at which the voice signal arrives, and the direction information on the received voice signal may be obtained based on the obtained incidence angle.

Meanwhile, the inputter 160 may receive a user command for registering at least one external device 200 as a registration device. In addition, the processor 130 may register at least one external device 200 as a registration device according to the user command input through the inputter 160. In addition, if the external device 200 identified by the signal of the metadata is included in at least one external device 200 registered as the registration device, the processor 130 may perform a voice recognition based on the voice signal of which direction information is the same as that of the external device 200 identified by the metadata signal.

Figure 4A:
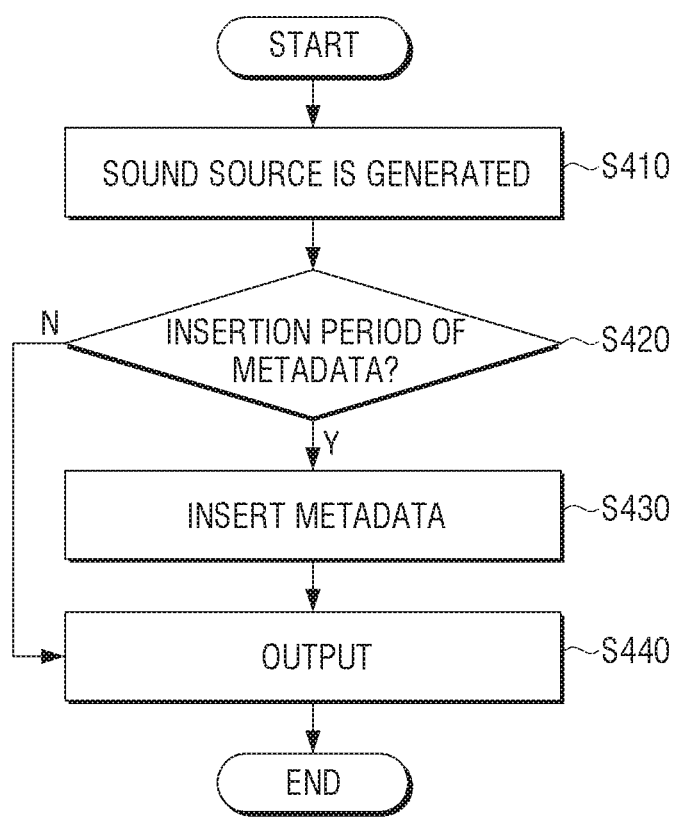
FIG. 4A is a view illustrating a voice signal and a metadata signal output by an external device according to an embodiment of the disclosure.
Figure 4B:
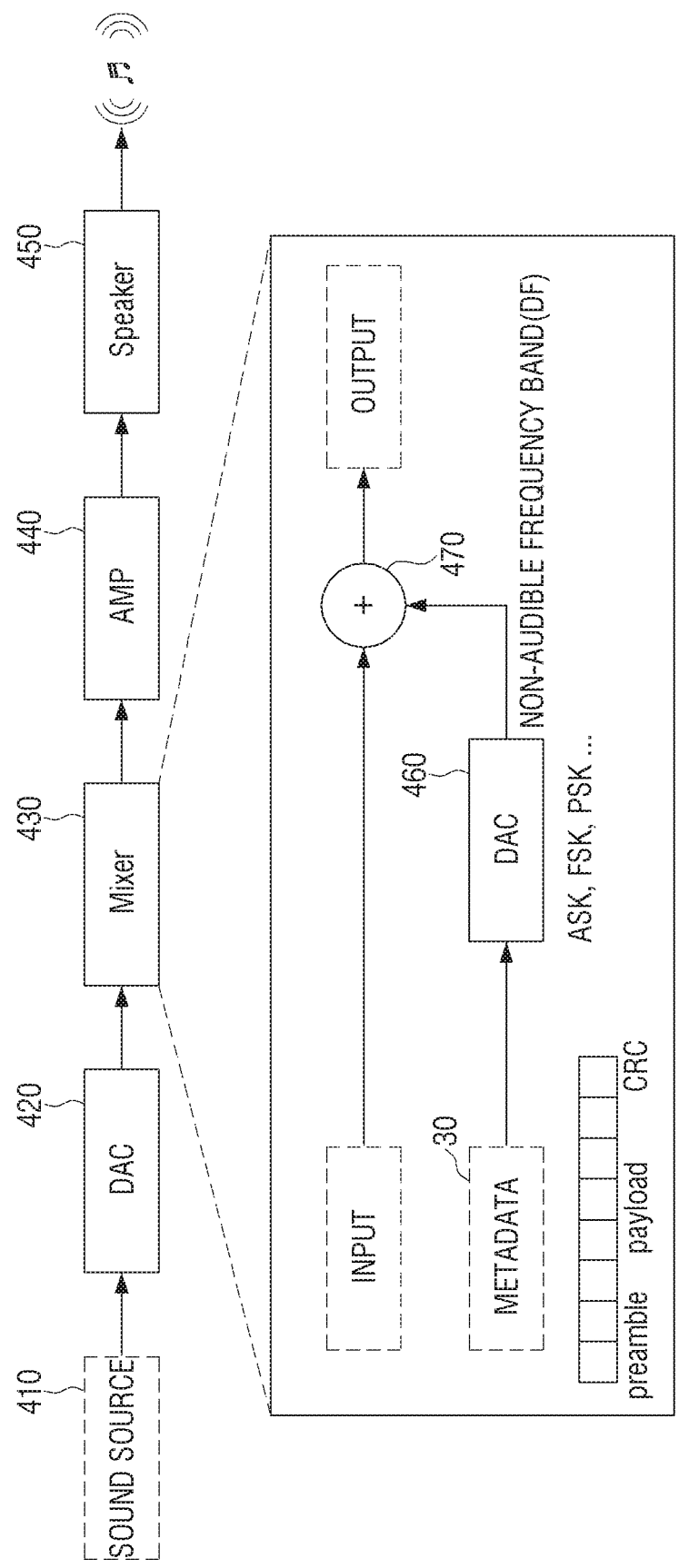
FIG. 4B is a view illustrating a voice signal and a metadata signal output by an external device according to an embodiment of the disclosure.

FIG. 4A and FIG. 4B are views illustrating a voice signal and a metadata signal output by than external device according to various embodiments of the disclosure.

Referring to FIG. 4A, if a sound source is generated from the external device 200 in operation S410, the external device 200 may determine whether the time point when the sound source is generated corresponds to the insertion period of the metadata to insert the metadata signal into the generated sound source, in operation S420.

Here, the insertion period of the metadata signal may be set differently according to the mobility of the electronic device 100 and the external device 200 according to the disclosure. For example, as a TV, if the usage location of the electronic device 100 and the external device 200 is generally fixed and the mobility thereof is low, there is a small actual profit to set a short insertion period of the metadata signal, but as a smartphone, if the usage location of the electronic device 100 and the external device 200 is frequently changed and the mobility thereof is high, it may be preferred to set the insertion period of the metadata signal shortly and update the direction information on the external device 200 with the short period.

Meanwhile, if it is determined that the time point when the sound source is generated corresponds to the metadata insertion period for insertion the metadata signal in S420-Y, the external device 200 may insert the metadata signal into the generated sound source in S430, and output the voice signal in which the metadata is inserted into the generated sound source in operation S440. On the contrary, if it is determined that the time point when the sound source is generated does not correspond to the metadata insertion period for inserting the metadata signal into the generated sound source in S420-N, the external device 200 may output the generated sound source without inserting the metadata signal into the generated sound source in S440.

Meanwhile, Referring to FIG. 4B, the process for inserting the metadata signal into the generated sound source may be performed as the process. Specifically, if the sound source 410 is generated, the external device 200 may convert the sound source 410 generated through a digital to analog converter (DAC) 420 from a digital signal to an analogue signal.

In addition, the external device 200 may convert the analogue signal converted through a mixer 430 into the voice signal to which the metadata is inserted. Specifically, the mixer 430 may modulate the input signal based on the modulation method, such as an amplitude shift keying (ASK), a frequency shift keying (FSK), and a phase shift keying (PSK), and the like, through a DAC 460. In addition, the mixer 430 may insert 470 the metadata signal into the input signal based on the predetermined insertion period and output the signal.

Meanwhile, the metadata signal may include a payload, a preamble, and an error detection code (a cyclic redundancy check (CRC)). Here, the payload may include the type of the external device 200 and information on the ID of the external device 200 as the information related to the identification of the external device. In addition, the preamble may include the code of a predetermined specific bit for confirmation of the metadata, and the error detection code may include the information for confirming whether the metadata is copied normally.

If the metadata is inserted into the generated sound source, the external device 200 may increase the intensity of the sound signal in which the metadata is inserted into the sound generated through the amplifier (AMP) 440, and output the sound signal through a speaker 450.

Meanwhile, the embodiment in which the metadata signal is inserted into the generated sound source and the voice signal is output accordingly has been illustrated, but the metadata signal is not always output in a form in which the metadata is inserted into the generated sound source. For example, according to another embodiment of the disclosure, the metadata signal may be output in a form of an individual signal.

Meanwhile, the embodiment in which the external device 200 outputs a voice signal has been illustrated, but according to another embodiment of the disclosure, the electronic device 100 may output the voice signal, and especially, output the voice signal to which the metadata signal is inserted. For example, the electronic device 100 may insert the metadata signal including the information related to the identification of the electronic device 100 into the obtained voice signal periodically, and output the voice signal to which the metadata signal is inserted through the communicator.

Figure 5A:
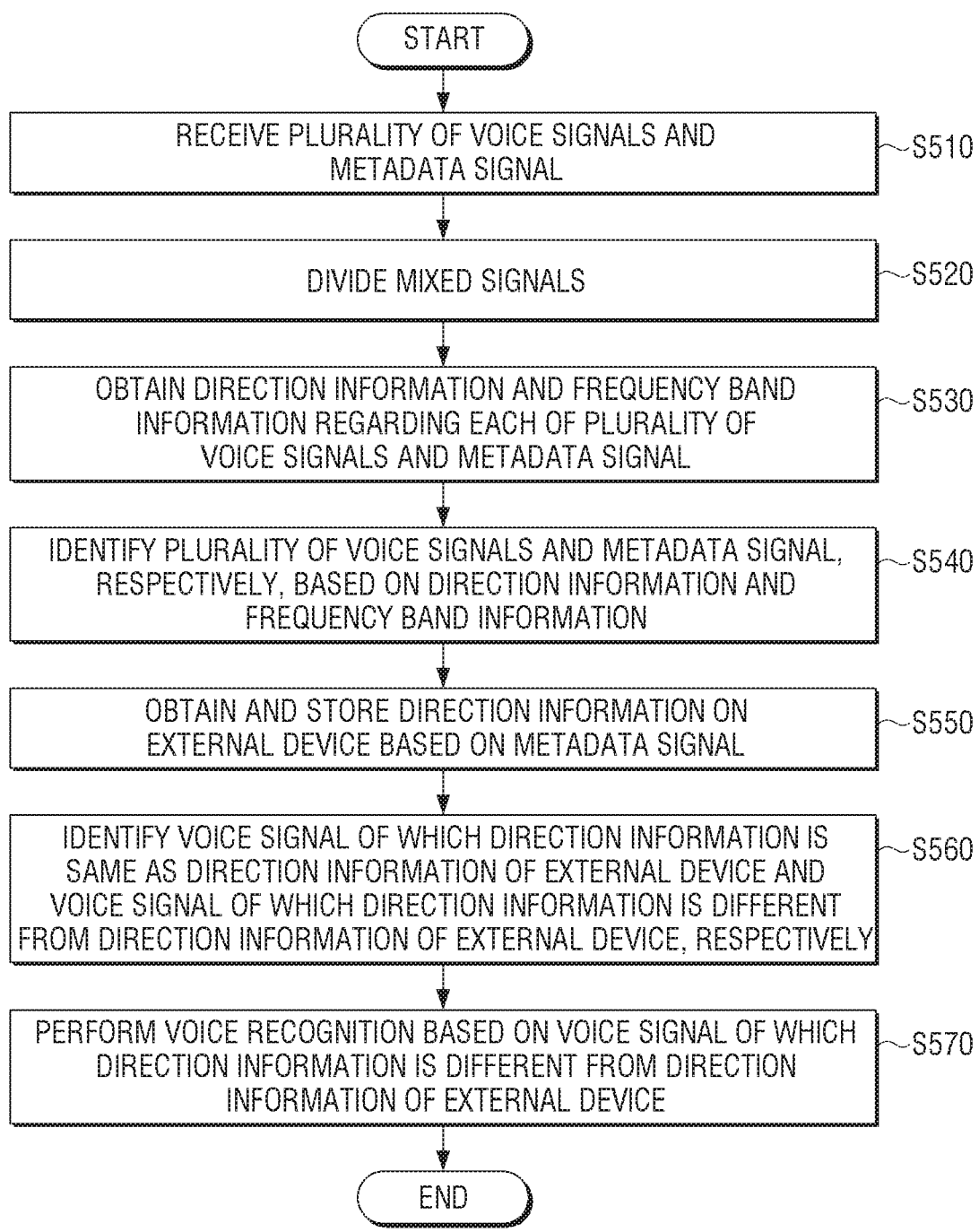
FIG. 5A is a view illustrating a process until an electronic device performs a voice recognition based on direction information regarding a plurality of voice signals and a metadata signal according to an embodiment of the disclosure.
Figure 5B:
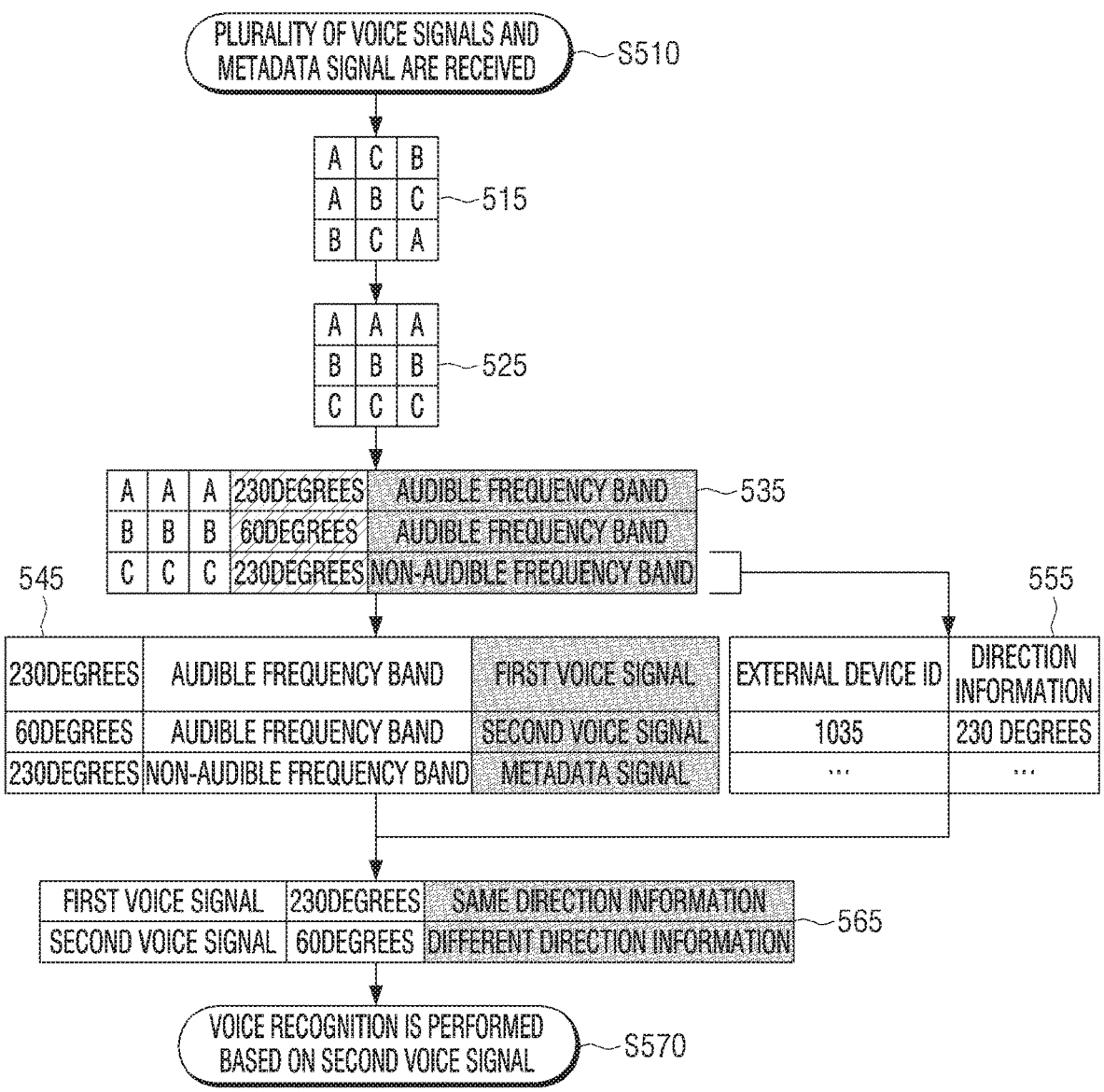
FIG. 5B is a view illustrating a process until an electronic device performs a voice recognition based on direction information regarding a plurality of voice signals and a metadata signal according to an embodiment of the disclosure.

FIG. 5A and FIG. 5B are views for illustrating a process until an electronic device performs a voice recognition based on direction information on a plurality of voice signals and a metadata signal according to various embodiments of the disclosure.

Referring to FIG. 5A, the electronic device 100 according to an embodiment may receive the plurality of voice signals and the metadata signal in operation S510. Specifically, the electronic device 100 may receive the plurality of voice signals through a plurality of microphones and the metadata signal of a non-audible frequency band regarding at least one of the plurality of voice signals.

Meanwhile, if the plurality of voice signals and the metadata signal are input at the same time, the plurality of voice signals and the metadata signal are received in a form of a mixed signal, and according thereto, the plurality of pieces of information included in the plurality of voice signals and the metadata signal may be obtained in a mixed form.

Referring to FIG. 5B, the plurality of pieces of information A, B, and C included in the plurality of voice signals and the metadata signal may be obtained in a mixed form in operation 515.

If the plurality of voice signals and the metadata signal are mixed and received, as illustrated in FIG. 5A, the electronic device 100 may divide the mixed signal in operation S520. Specifically, if the plurality of voice signals and the metadata signal are mixed and received, the electronic device 100 may divide the plurality of pieces of information included in the mixed signal into each signal using a blind source separation (BSS) technique. For example, as illustrated in FIG. 5B, the electronic device 100 may divide the plurality of pieces of information A, B, and C included in the mixed signal into each signal in operation 525.

Here, the BSS technique is a technique for dividing each voice signal from the plurality of voice signals which are mixed without any help in the mixing process of the signal, based on the statistical independence of each voice signal included in the plurality of voice signals, and specifically, may be performed using the techniques, such as an independent component separation (ICA) or a geometric source separation (GSS).

If the mixed signal is divided, as illustrated in FIG. 5A, the electronic device 100 may obtain the direction information and the frequency band information regarding each of the plurality of voice signals and the metadata signal in operation S530. Here, the direction information regarding each of the plurality of voice signals and metadata signal means the information on the direction of the location where the plurality of voice signals and the metadata signal are generated based on the electronic device 100. In addition, the direction information regarding each of the plurality of voice signals and metadata signal may be obtained by the DOA technique using the plurality of microphones.

Here, the DOA technique is a technique for obtaining direction information on the voice signal using the correlation of the voice signals input through each microphone among the plurality of microphones included in the microphone array. Specifically, according to the DOA technique, if the voice signal is received in a specific incidence angle to the plurality of microphones, the electronic device 100 obtains the incidence angle based on the delayed distance and the delayed time according to the difference of the distances between the voice signal and each of the microphones included in the plurality of microphones, at which the voice signal arrives and obtain the direction information on the received voice signal based on the obtained incidence angle.

For example, as illustrated in FIG. 5B, the electronic device 100 may obtain information including information that the signal including information A and the signal including information B are the voice signal in the audible frequency band, the information that the signal including information C is the metadata signal in the non-audible frequency band. In addition, the electronic device 100 may obtain direction information of 230 degrees as direction information on the voice signal including information A, direction information of 60 degrees as direction information on the voice signal including information B, and direction information of 230 degrees as direction information on the metadata signal in operation 535.

If direction information and the frequency band information regarding each of a plurality of voice signals and a metadata signal are obtained, as illustrated in FIG. 5A, the electronic device 100 may identify the plurality of voice signals and the metadata signal, respectively, based on the obtained direction information and the frequency band information in operation S540.

Specifically, the electronic device 100 may divide the metadata signal of the non-audible frequency band with a plurality of voice signals of the audible frequency band (20 Hz to 20 kHz) based on the obtained frequency band information, and divide the plurality of voice signals into each voice signal based on the obtained direction information, and identify a plurality of voice signals and the metadata.

For example, the electronic device 100 may identify the first voice signal in the audible frequency band of which direction information is 230 degrees, the second voice signal in the audible frequency band of which direction information is 60 degrees, and the metadata signal in the non-audible frequency band of which direction information is 230 degrees in operation 545.

Meanwhile, as illustrated in FIG. 5A, the electronic device 100 may obtain and store the direction information on the external device 200 based on the metadata signal in operation S550. Specifically, the electronic device 100 may receive the metadata signal periodically from the external device 200 and obtain and store the direction information on the external device 200 based on the metadata signal. For example, according to an embodiment of the disclosure, the direction information of the external device 200 may be updated based on the metadata signal that is periodically received.

For example, as illustrated in FIG. 5B, the electronic device 100 may obtain and store the information that the direction information of the external device 200 of which identification (ID) is 1035 is 230 degrees, based on the information related to the identification of the external device 200 included in the obtained metadata signal in 555, and the direction information of the external device 200 may be updated based in the metadata signal that is periodically received. In FIG. 5B, the case in which the direction information for one external device 200 is illustrated, but if the metadata signal is received from a plurality of external devices 200, each piece of direction information for the plurality of external devices 200 may be updated, needless to say.

If the direction information on the external device 200 is obtained, as illustrated in FIG. 5A, the electronic device 100 may identify the voice signal of which direction information is the same as that of the external device 200 and the voice signal of which direction information is different from that of the external device 200, respectively, from among the plurality of voice signals, based on the direction information on the external device 200, in operation S560.

For example, as illustrated in FIG. 5B, the electronic device 100 may identify the first voice signal of which direction information is the same as that of the external device 200, and the second voice signal of which direction information is different from that of the external device 200, respectively, in operation 565.

In addition, if the voice signal of which direction information is the same as that of the external device 200 and the voice signal of which direction information is different from that of the external device 200 are identified from among the plurality of voice signals, the electronic device 100 may perform a voice recognition based on the voice signal of which direction information is different from that of the external device 200, in operation S570.

Further, if the voice recognition is performed based on the voice signal of which direction information is different from that of the external device 200, the electronic device 100 may output the output voice corresponding to the text obtained according to the voice recognition, and control the operation of the electronic device 100 according to the control command obtained by the voice recognition.

Figure 6A:
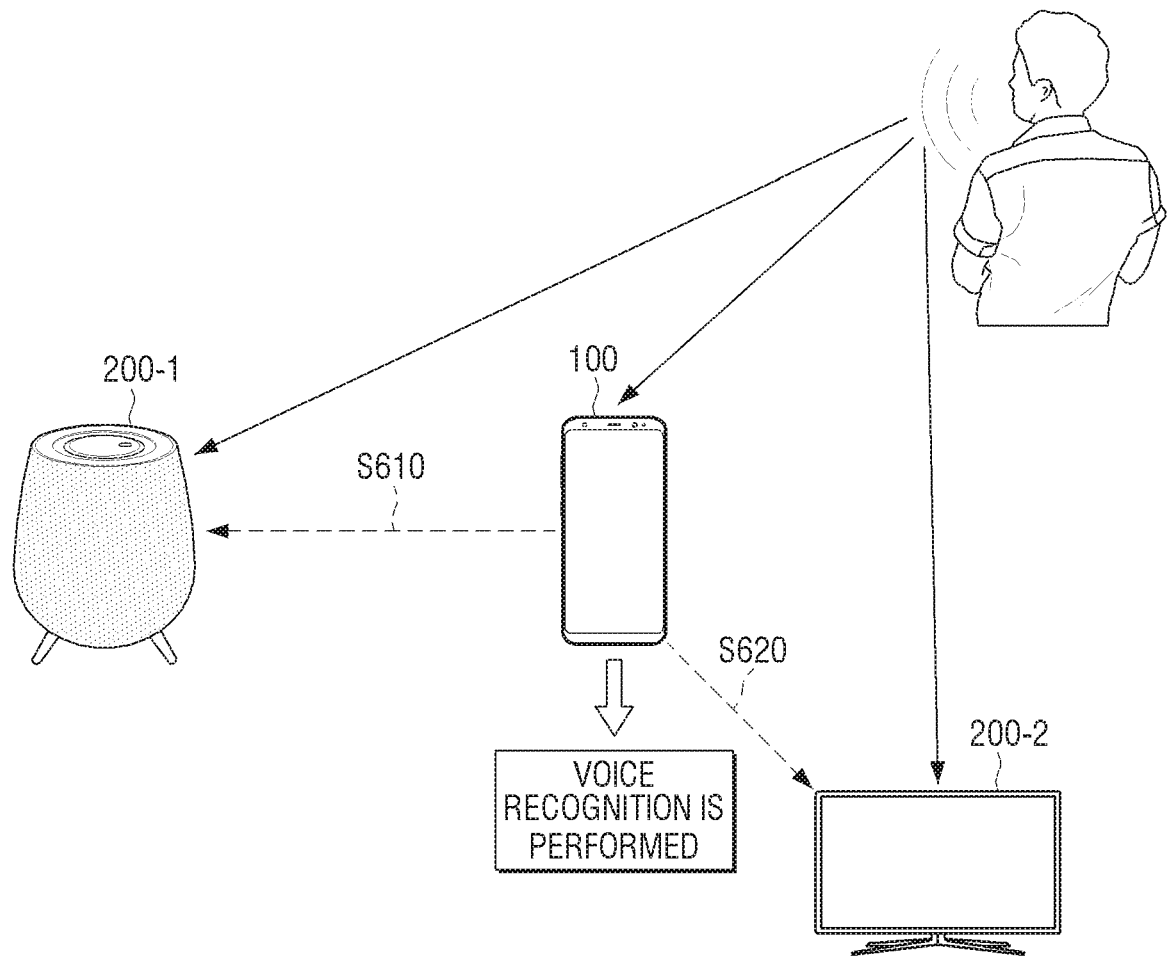
FIG. 6A is a view illustrating a process for determining a device to perform a voice recognition on at least one voice signal, from among an electronic device and external devices, based on information on relative locations of the electronic device and the external devices according to an embodiment of the disclosure.
Figure 6B:
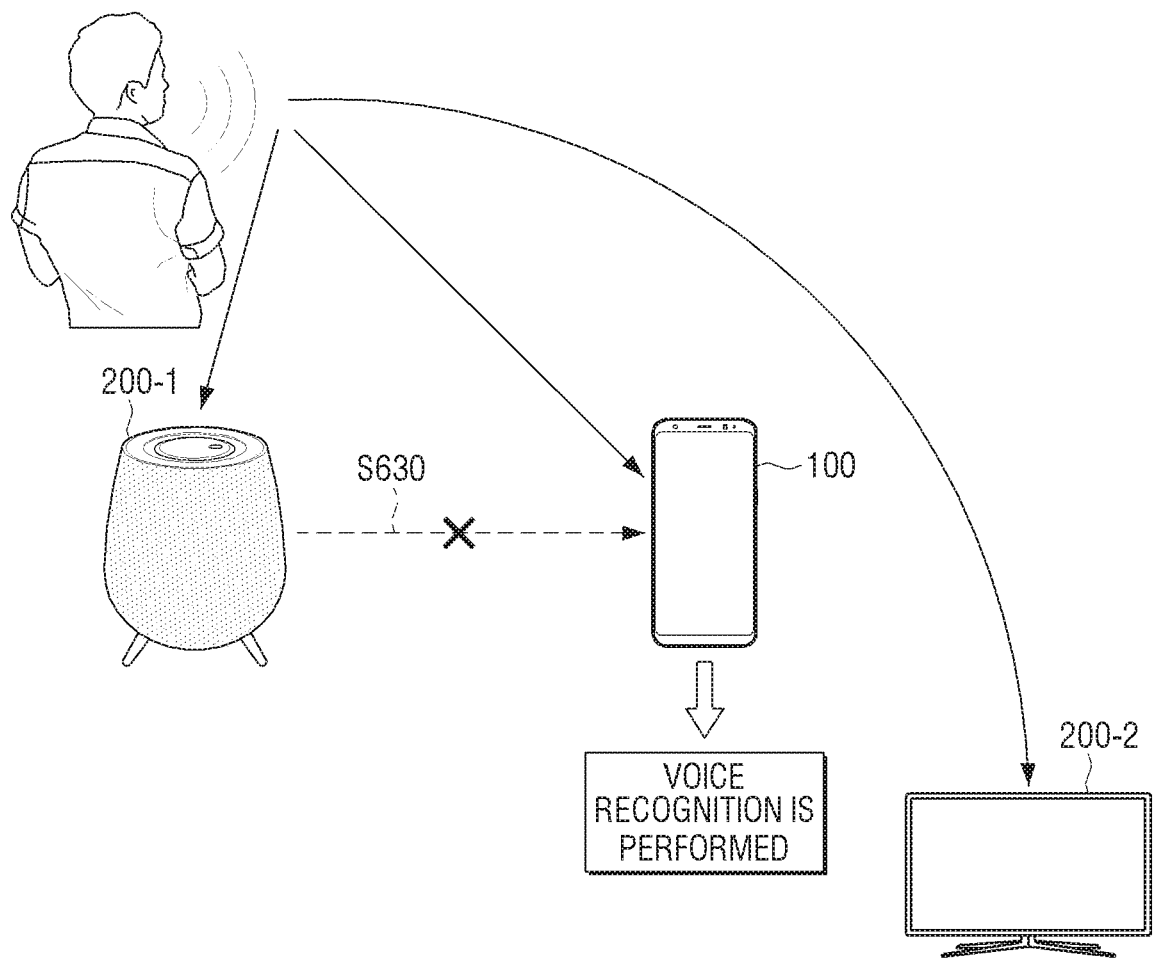
FIG. 6B is a view illustrating a process for determining a device to perform a voice recognition on at least one voice signal, from among an electronic device and external devices, based on information on relative locations of the electronic device and the external devices according to an embodiment of the disclosure.

FIG. 6A and FIG. 6B are views illustrating a process for determining a device to perform a voice recognition on at least one voice signal, from among an electronic device and external devices, based on information on relative locations of the electronic device and the external devices according to various embodiments of the disclosure.

Specifically, the electronic device 100 may obtain the information on the relative location of the electronic device 100 and the external devices 200-1 and 200-3 based on the direction information on the external devices 200-1 and 200-2. Here, the relative location of the electronic device 100 and the external devices 200-1 and 200-3 means the information on in which direction the external devices 200-1 and 200-2 are located based on the electronic device 100.

For example, if the information that the first external device 200-1 is located in the direction of 180 degrees based on the electronic device 100 is obtained as the direction information of the first external device 200-1, and the information that the second external device 200-2 is located in the direction of 300 degrees based on the electronic device 100 is obtained as the direction information on the second external device 200-2, the electronic device 100 may obtain the information on the relative location of the electronic device 100, the first external device 200-1, and the second external device 200-2 based on the direction information on the first external device 200-1 and the direction information on the second external device 200-2.

For example, the electronic device 100 may obtain the information on the relative location of the electronic device 100, the first external device 200-1 and the second external device 200-2 as illustrated in FIG. 6A and FIG. 6B based on the direction information regarding the external devices 200-1 and 200-3, and according thereto, obtain a device map regarding the relative location of the electronic device 100, the first external device 200-1, and the second external device 200-2.

Meanwhile, the electronic device 100 may receive the direction information on the electronic device 100 obtained by the first external device 200-1, and the direction information on the second external device 200-2 obtained by the first external device 200-1, from the first external device 200-1, and obtain the information on the relative location of the electronic device 100, the first external device 200-1, and the second external device 200-2 by considering all off the direction information received from the external devices 200-1 and 200-2, and the direction information obtained by the electronic device 100.

In addition, if the information on the relative location of the external device 100 and the external devices 200-1 and 200-2 is received, the electronic device 100 may determine the distance between the electronic device 100 and the location where at least one voice signal is generated, and the distance between the external devices 200-1 and 200-2 and the location where at least one voice signal is generated, respectively, based on the direction information regarding at least one voice signal from among a plurality of voice signals and the information on the relative location of the electronic device 100 and the external device 200-1.

If it is determined that the distance between the electronic device 100 and the location where at least one voice signal is generated is shorter than the distance between the external devices 200-1 and 200-2, and the location where at least one voice signal is generated, the electronic device 100 may transmit the confirmation response information that the electronic device 100 will perform a voice recognition based on at least one voice signal to the external devices 200-1 and 200-2 through a communicator, and perform a voice recognition based on at least one voice signal.

Referring to FIG. 6A, if it is determined that the distance between the electronic device 100 and the location where the voice signal according to a user voice is generated is shorter than the distance between the first external device 200-1 and the location where the voice signal according to a user voice is generated and the distance between the second external device 200-2 and the location where the voice signal according to a user voice is generated, the electronic device 100 may transmit the confirmation response information that the electronic device 100 will perform a voice recognition based on the voice signal according to the user voice to the first external device 200-1 and the second external device 200-2 in operation S610 and S620, and perform a voice recognition based on the voice signal according to the user voice.

On the contrary, if it is determined that the distance between the electronic device 100 and the location where at least one voice signal is generated is longer than the distance between the external devices 200-1 and 200-2 and the location where at least one voice signal is generated, the external devices 200-1 and 200-2 of which distance from the location where at least one voice signal is generated is shorter than the distance between the electronic device 100 and the location where at least one voice signal is generated, may perform a voice recognition based on at least one voice signal, and the electronic device 100 may not perform a voice recognition based on at least one voice signal.

Referring to FIG. 6B, if it is determined that the distance between the electronic device 100 and the location where the voice signal according to a user voice is generated is longer than the distance between the first external device 200-1 and the location where the voice signal according to a user voice is generated and the distance between the second external device 200-2 and the location where the voice signal according to a user voice is generated, the electronic device 100 may not perform a voice recognition based on the voice signal according to the user voice in operation S630.

However, according to an embodiment of the disclosure, even if it is determined that the distance between the electronic device 100 and the location where the voice signal according to a user voice is generated is longer than the distance between the external devices 200-1 and 200-2 and the location where the voice signal according to a user voice is generated, the electronic device 100 may perform a voice recognition based on the voice signal according to the user voice.

For example, if it is determined that the distance between the electronic device 100 and the location where at least one voice signal is generated is longer than the distance between the external devices 200-1 and 200-2 and the location where at least one voice signal is generated, and if a confirmation response information that the external devices 200-1 and 200-2 will perform a voice recognition based on at least one vice signal is not received from the external devices 200-1 and 200-2 through the communicator for a predetermined time, the electronic device 100 may perform a voice recognition based on at least one voice signal. Here, the predetermined time may be changed according to the user command, needless to say.

Referring to FIG. 6B, even if it is determined that the distance between the electronic device 100 and the location where the voice signal according to a user voice is generated is longer than the distance between the external devices 200-1 and 200-2 and the location where the voice signal according to a user voice is generated, if the confirmation response information the external devices 200-1 and 200-2 will perform a voice recognition based on the voice signal according to a user voice is not received from the external devices 200-1 and 200-2 through the communicator for a predetermined time, the electronic device 100 may perform a voice recognition based on the voice signal according to a user voice.

FIG. 7 is a flowchart illustrating a controlling method of an electronic device according to an embodiment of the disclosure.

Referring to FIG. 7, the electronic device 100 according to an embodiment of the disclosure receives a plurality of voice signals and a metadata signal in operation S710. Specifically, the electronic device 100 receives the plurality of voice signals and the metadata signal in the non-audible frequency band regarding at least one voice signal from among the plurality of voice signals through a plurality of microphones.

Specifically, if the external device 200 inserts the metadata signal including the information related to the identification of the external device 200 into the obtained voice signal periodically, and outputs the voice signal to which the metadata signal is inserted, the electronic device 100 may receive the voice signal and the metadata signal output by the external device 200. In addition, if a user utters a voice, the electronic device 100 may receive a voice signal according to the voice of a user.

If the plurality of voice signals and the metadata signal are received, the electronic device 100 may obtain the direction information and the frequency band information on each of the plurality of voice signals and the metadata signal in operation S720.

Here, the direction information on each of the plurality of voice signals and the metadata signal means the information on the direction of the generation location of the plurality of voice signals and the metadata signal based on the electronic device 100. In addition, the direction information on each of the plurality of voice signals and the metadata signal may be obtained by the DOA technique using a plurality of microphones.

If the direction information and the frequency band information on each of the plurality of voice signals and the metadata signal are obtained, the electronic device 100 may identify the plurality of voice signals and the metadata signal, respectively, based on the obtained direction information and the frequency band information in operation S730.

Specifically, the electronic device 100 may divide the metadata signal of the non-audible frequency band and a plurality of voice signals of the audible frequency band (20 Hz to 20 kHz) based on the obtained frequency band information, divide the plurality of voice signals into each voice signal based on the obtained direction information, and identify a plurality of voice signals and the metadata, respectively.

If each of the plurality of voice signals and the metadata signal are identified, the electronic device 100 may identify the voice signal of which direction information is the same as that of the metadata signal and the voice signal of which direction information is different from that of the metadata signal, respectively, in operation S740.

Specifically, the electronic device 100 may compare the direction information on the metadata signal and the direction information on the first voice signal and the second voice signal, and identify the voice signal of which direction information is the same as that of the metadata signal and the voice signal of which direction information is different from that of the metadata signal, respectively, from the plurality of voice signals.

Here, that the direction information is the same is not limited the case in which the direction information of different voice signals is physically the same, but includes the case in which the pieces of direction information of different voice signals are not physically the same but the difference thereof is within the predetermined range. In addition, here, the predetermined range is the range for considering the direction information of different voice signals to be the same although the direction information is not the same physically, and may be set differently according to the selection of the user considering the usage environment and the like of the electronic device 100.

The voice signal of which direction information is the same as that of the metadata signal and the voice signal of which direction information is not the same as that of the metadata signal, respectively, among the plurality of voice signals, the electronic device 100 may perform a voice recognition based on the identified voice signal in operation S750.

Specifically, the voice signal of which direction information is the same as that of the metadata signal and the voice signal of which direction information is not the same as that of the metadata signal, respectively, from among the plurality of voice signals, the electronic device 100 may filter the voice signal of which direction information is identified as the same as the direction information of the metadata signal, and perform a voice recognition only based on the voice signal identified to be different from the direction information of the metadata signal. In other words, the electronic device 100 may filter the voice signal output by the external device 200 and perform a voice recognition based on only the voice signal according to the user voice.

Meanwhile, the controlling method of the electronic device 100 according to the above described embodiment of the disclosure may be implemented as a program and provided to the electronic device 100. Especially, the program including the controlling method of the electronic device 100 may be stored in a non-transitory computer readable medium and provided.

Specifically, in the non-transitory computer readable medium including the program executing the controlling method of the electronic device 100, the controlling method of the electronic device 100 may include receiving a plurality of voice signals through a plurality of microphones and a metadata signal of a non-audible frequency band regarding at least one of the plurality of voice signals, obtaining direction information and frequency band information regarding each of the plurality of plurality of voice signals and the metadata signal, identifying each of the plurality of voice signals and the metadata signal based on the direction information and the frequency band information regarding the plurality of plurality of voice signals and the metadata signal, identifying a voice signal of which direction information is the same as that of the metadata signal and a voice signal of which direction information is different from that of the metadata signal, respectively, from among the plurality of voice signals, and performing a voice recognition based on the voice signal of which direction information is different from that of the metadata signal.

Here, the non-transitory computer readable medium is not a medium that stores data for a short moment, such as a register, a cash and a memory and the like, but a medium that stores data semi-permanently and which is readable by an apparatus. Specifically, programs for performing the above-described various methods can be stored in a non-transitory computer readable medium, such as a compact disc (CD), a DVD, a hard disk, a Blu-ray disk, universal serial bus (USB), a memory card, ROM, or the like, and can be provided.

According to an embodiment of the disclosure, the electronic device 100 may filter the voice signal output by the external device 200 based on the direction information of the metadata signal received from the external device 200, and perform an accurate voice recognition based on the user voice.

In addition, the electronic device 100 according to the disclosure reflects the direction information of the metadata signal received from the external device 200 in real time, and thus, regardless of the change of the location of the external device 200, filter the voice signal output by the external device 200 accurately.

In addition, the electronic device 100 according to the disclosure filters the voice signal output by the external device 200 based on whether the direction information of the metadata signal is the same as the direction information of the voice signal, and thus, may perform a smooth voice recognition regardless of the change of the usage environment, such as a temperature and a humidity.

According to the various embodiments, the respective elements (e.g., a module or a program) of the elements mentioned above may include a single entity or a plurality of entities. According to the various embodiments, at least one element or operation from among the corresponding elements mentioned above may be omitted, or at least one other element or operation may be added. Alternatively or additionally, a plurality of components (e.g., a module or a program) may be combined to form a single entity. In this case, the integrated entity may perform functions of at least one function of an element of each of the plurality of elements in the same manner as or in a similar manner to that performed by the corresponding element from among the plurality of elements before integration.

The module, a program module, or operations executed by other elements according to variety of embodiments may be executed consecutively, in parallel, repeatedly, or heuristically, or at least some operations may be executed according to a different order, may be omitted, or the other operation may be added thereto.

A term used in the disclosure "module" or "unit" includes a unit consists of a hardware, a software or a firmware, and may be interchanged with the terms, for example, a logic, a logic block, an element, or a circuit, and the like. The "module" or "unit" may be also a minimum unit that is configured to perform one or more functions or a part thereof. For example, the module may include an application-specific integrated circuit chip (ASIC).

The above-described various embodiments may be realized as a software including an instruction which may be stored in a machine-readable storage media which may be read by a machine (e.g., a computer). The machine is an apparatus that calls the instructions stored in the storage media and which may operate according to the called instructions, and may include the electronic device in the embodiments (e.g., an electronic device 100).

If the instruction is executed by a processor, the processor may perform the function corresponding to the instructions by itself or by using the other elements under control of the processor. The instruction may include code generated or executed by a compiler or an interpreter.

A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

According to an embodiment, the method according to the above-described various embodiments may be provided as being included in a computer program product. The computer program product may be traded as a product between a seller and a consumer.

The computer program product may be distributed online in the form of machine-readable storage media (e.g., CD-ROM) or through an application store (e.g., Play Store™ and App Store™). In the case of online distribution, at least a portion of the computer program product may be at least temporarily stored or temporarily generated in a server of the manufacturer, a server of the application store, or a storage medium, such as memory of a relay server.

According to the various embodiments, the respective elements (e.g., a module or a program) of the elements mentioned above may include a single entity or a plurality of entities. According to the various embodiments, at least one element or operation from among the corresponding elements mentioned above may be omitted, or at least one other element or operation may be added. Alternatively or additionally, a plurality of components (e.g., a module or a program) may be combined to form a single entity. In this case, the integrated entity may perform functions of at least one function of an element of each of the plurality of elements in the same manner as or in a similar manner to that performed by the corresponding element from among the plurality of elements before integration.

The module, a program module, or operations executed by other elements according to variety of embodiments may be executed consecutively, in parallel, repeatedly, or heuristically, or at least some operations may be executed according to a different order, may be omitted, or the other operation may be added thereto.

While the disclosure has been shown and described with reference to various embodiments thereof, it will be understood by those skilled in the art that various changes in form and details may be made therein without departing from the scope and spirit of the disclosure the appended claims and their equivalents.

What is claimed is:

1. An electronic device comprising:
a plurality of microphones;
a memory including at least one command; and
a processor configured to:
execute the at least one command,
wherein the processor is further configured to:
receive a plurality of voice signals and a metadata signal in a non-audible frequency band regarding at least one of the plurality of voice signals, through the plurality of microphones,
obtain direction information and frequency band information regarding each of the plurality of voice signals and the metadata signal,
identify the plurality of voice signals and the metadata signal, respectively, based on the direction information and the frequency band information,
identify a voice signal of which direction information is same as direction information of the metadata signal and a voice signal of which direction information is different from direction information of the metadata signal, respectively, among the plurality of voice signals, and
perform a voice recognition based on the voice signal of which direction information is different from direction information of the metadata signal.

2. The electronic device of claim 1,
wherein the voice signal of which direction information is different from direction information of the metadata signal among the plurality of voice signals is a voice signal according to a voice of a user,
wherein the voice signal of which direction information is same as direction information of the metadata signal among the plurality of voice signals is a voice signal output by an external device, and
wherein the metadata signal includes information related to an identification of the external device.

3. The electronic device of claim 2, wherein the processor is further configured to:
receive the metadata signal periodically from the external device, and
obtain and store direction information regarding the external device based on the metadata signal.

4. The electronic device of claim 3, wherein the processor is further configured to:
identify the voice signal of which direction information is same as direction information of the external device and the voice signal of which direction information is different from direction information of the external device, respectively, among the plurality of voice signals, based on direction information regarding the external device, and
perform the voice recognition based on the voice signal of which direction information is different from direction information of the external device.

5. The electronic device of claim 4, further comprising:
an inputter including a circuit,
wherein the processor is further configured to:
register at least one external device as a registration device according to a user command input through the inputter, and
based on the external device being included in at least one external device registered as the registration device, perform the voice recognition based on the voice signal of which direction information is same as direction information of the external device.

6. The electronic device of claim 3, wherein the processor is further configured to:
obtain information on a relative location of the electronic device and the external device based on direction information regarding the external device, and
determine a distance between the electronic device and a location where at least one voice signal is generated and a distance between the external device and a location where the at least one voice signal is generated, respectively, based on direction information on the at least one voice signal among the plurality of voice signals and information on the relative location of the electronic device and the external device.

7. The electronic device of claim 6, further comprising:
a communicator including a circuit,
wherein the processor is further configured to, based on the distance between the electronic device and the location where the at least one voice signal is generated being determined to be shorter than the distance between the external device and the location where the at least one voice signal is generated:
transmit confirmation response information that the electronic device will perform the voice recognition based on the at least one voice signal to the external device through the communicator, and
perform the voice recognition based on the at least one voice signal.

8. The electronic device of claim 7, wherein the processor is further configured to:
in response to identifying that the distance between the electronic device and the location where the at least one voice signal is generated is longer than the distance between the external device and the location where the at least one voice signal is generated, and confirmation response information that the external device performs the voice recognition based on the at least one voice signal is not received from the external device through the communicator for a predetermined time, perform the voice recognition based on the at least one voice signal.

9. The electronic device of claim 1, further comprising:
an outputter including a circuit,
wherein the processor is further configured to:
insert the metadata signal including information related to an identification of the electronic device into an obtained voice signal periodically, and
output the voice signal to which the metadata signal is inserted, through the outputter.

10. The electronic device of claim 1, wherein the processor is further configured to:
based on the plurality of voice signals and the metadata signal being mixed and received, divide the plurality of voice signals and the metadata signal using a blind source separation (BSS) technique, and obtain direction information regarding each of the plurality of voice signals and the metadata signal using a direction of arrival (DOA) technique using the plurality of microphones.

11. A controlling method of an electronic device, the method comprising:

receiving a plurality of voice signals and a metadata signal in a non-audible frequency band regarding at least one of the plurality of voice signals, through a plurality of microphones of the electronic device;

obtaining direction information and frequency band information regarding each of the plurality of voice signals and the metadata signal;

identifying the plurality of voice signals and the metadata signal, respectively, based on the direction information and the frequency band information;

identifying a voice signal of which direction information is same as direction information of the metadata signal and a voice signal of which direction information is different from direction information of the metadata signal, respectively, among the plurality of voice signals; and performing a voice recognition based on the voice signal of which direction information is different from the direction information of the metadata signal.

12. The method of claim 11, wherein the voice signal of which direction information is different from direction information of the metadata signal among the plurality of voice signals is a voice signal according to a voice of a user;

wherein the voice signal of which direction information is same as direction information of the metadata signal among the plurality of voice signals is a voice signal output by an external device; and wherein the metadata signal includes information related to an identification of the external device.

13. The method of claim 12, further comprising:

receiving the metadata signal periodically from the external device; and obtaining and storing direction information regarding the external device based on the metadata signal.

14. The method of claim 13, further comprising:

identifying the voice signal of which direction information is same as direction information of the external device and the voice signal of which direction information is different from direction information of the external device, respectively, among the plurality of voice signals, based on direction information regarding the external device; and performing the voice recognition based on the voice signal of which direction information is different from direction information of the external device.

15. The method of claim 14, further comprising:

registering at least one external device as a registration device according to a user command; and based on the external device being included in at least one external device registered as the registration device, performing the voice recognition based on the voice signal of which direction information is same as direction information of the external device.

16. The method of claim 13, further comprising:

obtaining information on a relative location of the electronic device and the external device based on direction information regarding the external device; and determining a distance between the electronic device and a location where at least one voice signal is generated and a distance between the external device and a location where the at least one voice signal is generated, respectively, based on direction information on the at least one voice signal among the plurality of voice signals and information on the relative location of the electronic device and the external device.

17. The method of claim 16, further comprising:

based on the distance between the electronic device and the location where the at least one voice signal is generated being determined to be shorter than the distance between the external device and the location where the at least one voice signal is generated, transmitting confirmation response information that the electronic device will perform a voice recognition based on the at least one voice signal to the external device; and performing the voice recognition based on the at least one voice signal.

18. The method of claim 16, further comprising:

in response to identifying that the distance between the electronic device and the location where the at least one voice signal is generated is longer than the distance between the external device and the location where the at least one voice signal is generated, and confirmation response information that the external device performs the voice recognition based on the at least one voice signal is not received from the external device for a predetermined time, performing the voice recognition based on the at least one voice signal.

19. The method of claim 11, further comprising:

inserting the metadata signal including information related to an identification of the electronic device into an obtained voice signal periodically; and outputting the voice signal to which the metadata signal is inserted, through an outputter of the electronic device.

20. At least one non-transitory computer readable medium which includes a program for executing a controlling method of an electronic device, the method comprising:

receiving a plurality of voice signals and a metadata signal in a non-audible frequency band regarding at least one of the plurality of voice signals, through a plurality of microphones of the electronic device;

obtaining direction information and frequency band information regarding each of the plurality of voice signals and the metadata signal;

identifying the plurality of voice signals and the metadata signal, respectively, based on the direction information and the frequency band information;

identifying a voice signal of which direction information is same as direction information of the metadata signal and a voice signal of which direction information is different from direction information of the metadata signal, respectively, among the plurality of voice signals; and performing a voice recognition based on the voice signal of which direction information is different from the direction information of the metadata signal.

* * * * *